(12) United States Patent
Peters et al.

(10) Patent No.: US 9,682,824 B2
(45) Date of Patent: Jun. 20, 2017

(54) SUPPORT STRUCTURE AS WELL AS A CONVEYOR SYSTEM COMPRISING SUCH A SUPPORT STRUCTURE

(71) Applicant: Marel Stork Poultry Processing B.V., Boxmeer (NL)

(72) Inventors: Erik Hendrikus Werner Peters, Boxmeer (NL); Henricus Franciscus Jacobus Maria Van Der Eerden, Gemert (NL)

(73) Assignee: Marel Stork Poultry Processing B.V., Boxmeer (NL)

( * ) Notice: Subject to any disclaimer, the term of this patent is extended or adjusted under 35 U.S.C. 154(b) by 0 days.

(21) Appl. No.: 15/023,304

(22) PCT Filed: Oct. 3, 2014

(86) PCT No.: PCT/NL2014/050684
§ 371 (c)(1),
(2) Date: Mar. 18, 2016

(87) PCT Pub. No.: WO2015/050450
PCT Pub. Date: Apr. 9, 2015

(65) Prior Publication Data
US 2016/0229636 A1    Aug. 11, 2016

(30) Foreign Application Priority Data
Oct. 4, 2013  (NL) ...................................... 2011560

(51) Int. Cl.
*B65G 15/60*    (2006.01)
*B65G 15/62*    (2006.01)
(Continued)

(52) U.S. Cl.
CPC ............. *B65G 15/60* (2013.01); *B65G 15/62* (2013.01); *B65G 21/02* (2013.01); *F16B 3/00* (2013.01); *F16B 5/0072* (2013.01)

(58) Field of Classification Search
CPC ........ B65G 21/06; B65G 15/62; B65G 21/02; B65G 15/60; F16B 3/00; F16B 5/0072
See application file for complete search history.

(56) References Cited

U.S. PATENT DOCUMENTS 4,099,887 A * 7/1978 Mackenroth ......... A63H 33/065
                                                   40/739
5,001,816 A * 3/1991 Oetiker ..................... F16B 2/08
                                                   24/20 CW
(Continued)

FOREIGN PATENT DOCUMENTS

DE            20211823 U1    1/2003

OTHER PUBLICATIONS

International Search Report, International Patent Application No. PCT/NL2014/050684, mailed Jan. 15, 2015.

*Primary Examiner* — Mark A Deuble
(74) *Attorney, Agent, or Firm* — Casimir Jones, SC

(57) ABSTRACT

The invention provides a support structure comprising a combination of a first plate-shaped support element having a first circumference and a second plate-shaped support element having a second circumference, wherein circumferential parts of the first circumference and the second circumference, respectively, have corresponding shapes such that a shape fitting connection between the respective circumferential parts in aligned condition of the support elements is possible. The combination comprises at least one passage near the connection in the connected condition of the circumferential parts, as well as at least one connecting element which extends at least partially within the at least one passage so as to limit movement of the support elements
(Continued)

relative to each other in the thickness direction. The at least one passage is formed by parts of the connecting circumferential parts of the first circumference and the second circumference.

11 Claims, 24 Drawing Sheets

(51) Int. Cl.
  *B65G 21/02* (2006.01)
  *F16B 3/00* (2006.01)
  *F16B 5/00* (2006.01)

(56) References Cited

U.S. PATENT DOCUMENTS

| | | | | |
|---|---|---|---|---|
| 5,421,451 | A * | 6/1995 | Easton | F16B 35/044 |
| | | | | 198/860.1 |
| 6,170,649 | B1 * | 1/2001 | Radandt | B65G 21/06 |
| | | | | 198/860.1 |
| 7,114,615 | B1 | 10/2006 | Karpy | |
| 7,997,405 | B2 * | 8/2011 | Karpy | B65G 15/62 |
| | | | | 198/860.1 |
| 2010/0213037 | A1 * | 8/2010 | Avery | B65G 15/62 |
| | | | | 198/861.2 |
| 2016/0160894 | A1 * | 6/2016 | Kadoma | F16B 3/00 |
| | | | | 403/375 |

* cited by examiner

SUPPORT STRUCTURE AS WELL AS A CONVEYOR SYSTEM COMPRISING SUCH A SUPPORT STRUCTURE

The present invention relates to a support structure for installations such as for conveyor systems. More in particular the invention relates to a support structure according to the preamble of claim 1 amongst others comprising a combination of a first plate-shaped support element and a second plate-shaped support element.

Conveyor systems for transporting goods for instance using an endless conveyor belt are known in many variations. Efforts have also been made to provide a modular build-up of such conveyor systems.

For example, from CA 2,054,159 (1992 Jun. 28, Dynamic Conveyor Corp.) is known a modular system for a conveyor having a belt support frame, leg supports for the frame and a continuous belt supported and guided by the frame for continuous movement of the belt. The belt support frame is made up from a plurality of modular assemblies arranged end to end. A cross member has opposing connector frames and belt guides, creating comparably large contact surfaces between sub-assemblies when mounted together. This is not desirable when using the conveyor system in the food industry because of the larger risk of contamination of these surface joints. The hidden contact surfaces may serve as hiding places for bacteria and are relatively difficult to clean properly.

U.S. Pat. No. 4,982,835 (1991 Jan. 8, Butler et al.) discloses a modular conveyor system having longitudinal edge rails onto which legs and other support structures may be clamped. Again, comparably large contact surfaces are created between sub-assemblies when mounted together and this is undesirable for the same reasons as discussed earlier.

A conveyor frame is disclosed in EP 1 338 533 B1 (2004 Dec. 22, FPS Food Processing Systems B.V.). The frame has longitudinal bars clamped together with multi-clamping blocks and bars may be joined together in the longitudinal direction using joining pieces. Also this solution results in comparably large contact surfaces being created between sub-assemblies when mounted together and, again, this is undesirable for the same reasons as discussed earlier.

A conveyor frame assembly having extruded profiled rails making up longitudinal as well as transverse frame components is disclosed in US 2008/0210529 (2008 Sep. 4, Hau et al.). Fasteners are slidably insertable into grooves of the rails and are used to attach different rails to each other. Not only are the contact areas between adjacent rails relatively large, the rails themselves have several channels or grooves that severely hinders effective cleaning of the conveyor frame.

The support structure as described in German publication DE 202 11 823 U1 comprises a round hole in one of the plate shaped support elements for extension there through of screw means.

The present invention aims to provide a relatively cheap and adaptable support structure which in particular, but not exclusively, is suitable for use in the food industry, in particular the meat industry. In the food industry special requirements apply regarding hygiene. To this end the invention provides a support structure according to the introduction the at least one passage of which is formed by parts of the connecting circumferential parts of the first circumference and the second circumference. This way no separate passages need to be made in either of the plate-shaped support elements on the one hand limiting the costs for manufacturing the combination of the first and second support elements but also reducing possible undesirable hidden contact surfaces on support elements of the support structure while still providing to the support structure mechanical strength required for the correct functioning of the support structure. The support structure according to the invention is basically plate shaped, thus of generally flat configuration having a thickness that is relatively small compared to other dimensions of the support structure. The actual thickness depends on the material of the plate-shaped support element as well as the required load capacity for the support structure. The plate shaped support elements typically each have a top edge, a bottom edge and opposing side edges. The plate shaped support elements are arranged to cooperate edge to edge with each other for providing the shape fitting connection. The shape fitting connection typically has a shaped slot arranged in one of the plate-shaped support element to cooperate with a shaped protrusion in the other of the plate-shaped support elements. The support structure uses at least one connecting element, such as a removable fastener. The connecting elements cooperate with the shape fitting connection between the plate shaped support elements to clamp the aligned plate-shaped support elements together. Further, the invention provides a support structure having a true modular structure with a limited number of different components combining to be part of installations, such as conveyor systems, of any desired dimensions/lengths and (vertical) configuration. The invention is advantageously employed for the transport of food products, in particular meat products.

The at least one connecting element preferably comprises at least one bolt-nut combination wherein the shank of the bolt extends through the at least one passage. Such a fastener is easy to apply and to remove. Optionally washers are used in combination with the bolt-nut combination.

When the at least one passage has an unround shape, the passage can cooperate with a shape fitting part of the shank of the bolt to prevent unwanted turning of the bolt during appliance or removal of the fastener.

Reliable clamping of the aligned plate-shaped support elements by the at least one connecting elements is possible when the thickness of the first plate-shaped support element is the same as the thickness of the second support element. This way when the shape fitting connection is fastened using the at least one connecting element which clamps both the connecting elements, relative movement of the plate-shaped connecting elements relative to each other in the thickness direction is prevented.

In some uses, such as for tray attachments or for tiltable side support holders, however it may be beneficial if there is some play of one the support elements relative to the other in the thickness direction of the plate-shaped support elements. To this end it may be beneficial if the thickness of the first plate-shaped support element is different from the thickness of the second support element. In case of use of connecting elements which are arranged for clamping, some relative movement will be possible between the plate-shaped support elements because the connecting element clamps against the thickest of the two support elements.

Preferably the thickness of the first plate-shaped support element and the thickness of the second support element differ from each other by a factor of at most two.

Preferably the thickness of the first plate-shaped support element and/or the thickness of the second support element is at most 5 mm. When using such thickness seams between the plate-shaped support elements can still relatively easy be penetrated by cleaning agents to wash away contaminations in such seams.

In order to make the support structure in particular suitable for use in the food industry, the plate-shaped support elements are preferably made of stainless steel. However for food industry other materials which are food use approved, corrosion resistant and suitable for use in refrigerated environments may be used as well. Examples are titanium, food approved polymers and similar materials.

At least one of the plate-shaped support elements may have mounting means arranged to fasten other elements such as legs, return conveyor guides, tension rollers, sensors, human interfaces and cable holders to the plate-shaped support elements. Such other elements preferably are plate-shaped like the support elements allowing a connection between the support elements and other elements which is similar to the connection between the two support elements so by using a shape-fitting connection and at least one connecting element extending within a passage near the connection.

The present invention also relates to a conveyor comprising an endless, belt-like flexible conveying element for conveying products along a conveying path on an upper part of the conveying element, a frame relative to which two pulley means are rotatable about horizontal axes of rotation extending perpendicularly to the conveying path, wherein the conveying element is passed of the pulley means, the frame comprising an elongate main support member extending parallel to the conveying path and a number of transverse support members which extend transversely to the elongate main support member and which are connected to the elongate main support member in spaced-apart relationship, wherein the transverse support members support at least one guide member extending parallel to the conveying path, which supports and guides at least the upper part of the conveying element during use of the conveyor, wherein at least some of the transverse support members comprise a support structure according to the invention as described above and wherein preferably the plate-shaped support elements extend vertically. If the plate-shaped support elements extend vertically, any seams between the plate-shaped support elements extend horizontally limiting the risk of contaminants entering the seams. The elongate main support member functions as a backbone of the support structure.

It may also be advantageous to provide a conveyor as described above however without the transverse support members comprising a support structure according to the invention. This would result in a conveyor comprising an endless, belt-like flexible conveying element for conveying products along a conveying path on an upper part of the conveying element, a frame relative to which two pulley means are rotatable about horizontal axes of rotation extending perpendicularly to the conveying path, wherein the conveying element is passed of the pulley means, the frame comprising an elongate main support member extending parallel to the conveying path and a number of transverse support members which extend transversely to the elongate main support member and which are connected to the elongate main support member in spaced-apart relationship, wherein the transverse support members support at least one guide member extending parallel to the conveying path, which supports and guides at least the upper part of the conveying element during use of the conveyor.

The aspects and optional details of the invention will be explained below with reference to the drawings. In the drawings:

FIG. 7b shows a detail of FIG. 7a;

FIG. 9a1 shows an alternative detail of FIG. 9a;

Figure 1:
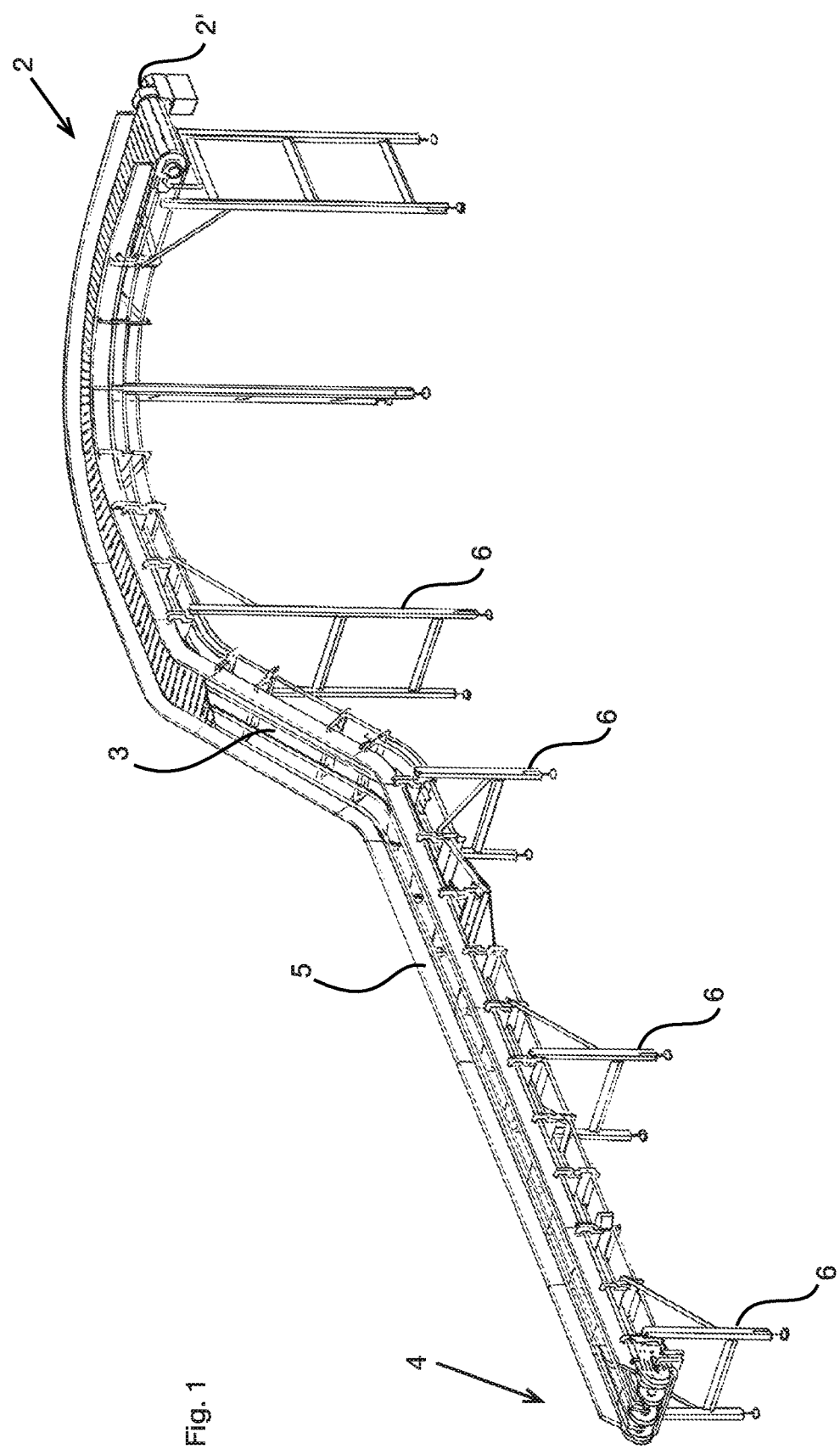
FIG. 1 shows schematically a conveyor system according to the invention comprising a combination of support elements according to the invention.
Figure 2:
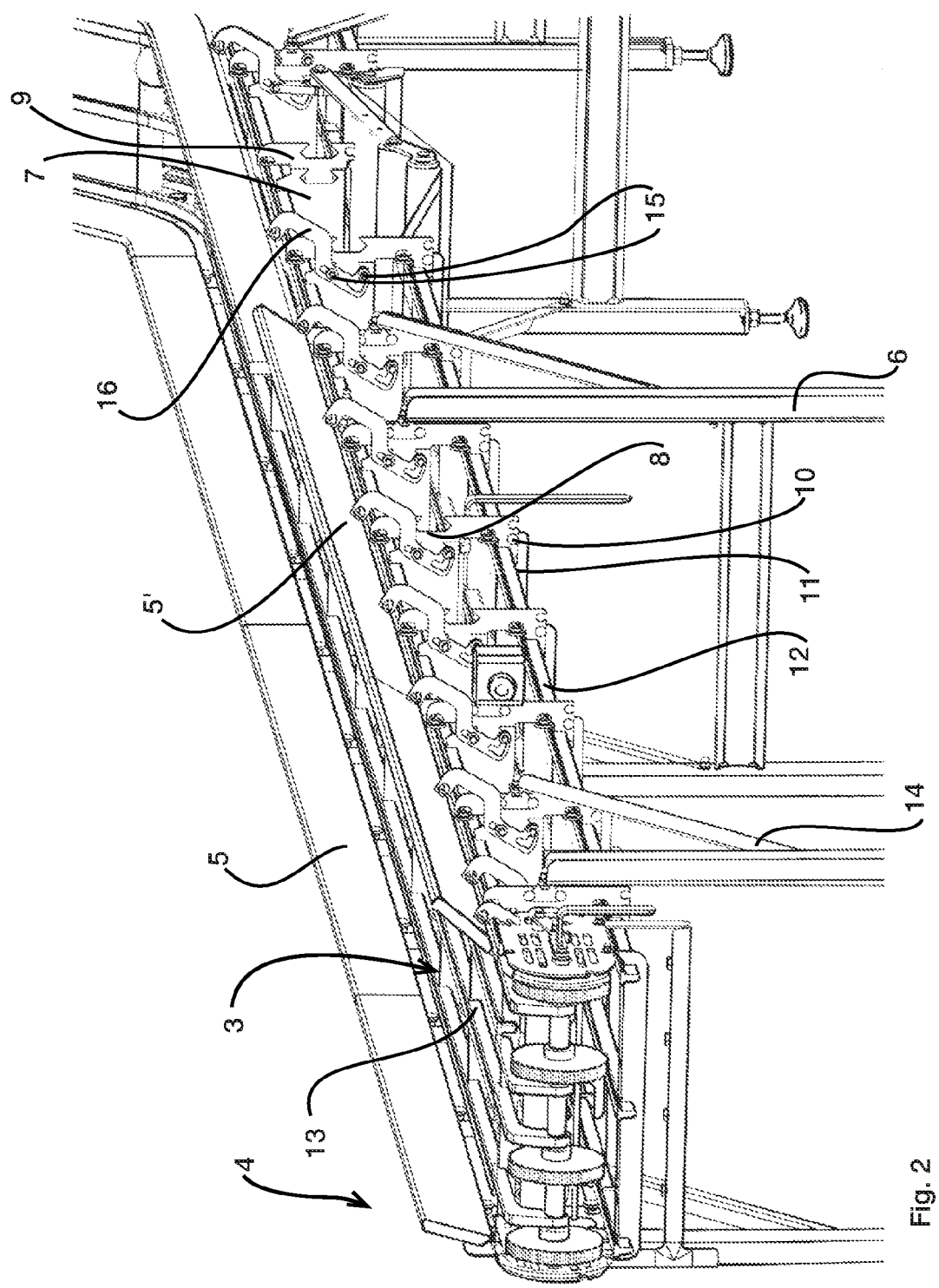
FIG. 2 shows a non-driven pulley end of the conveyor system of FIG. 1.
Figure 9A:
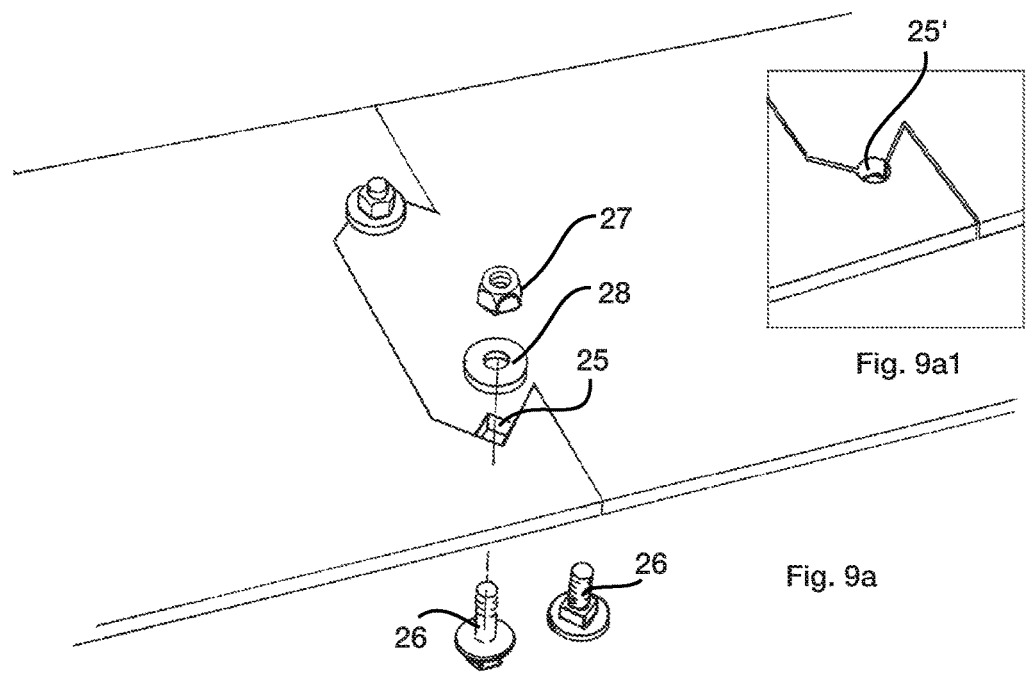
FIG. 9a-9e show four alternative embodiments of shape fitting connections as can be used within the context of the invention
Figure 9B:
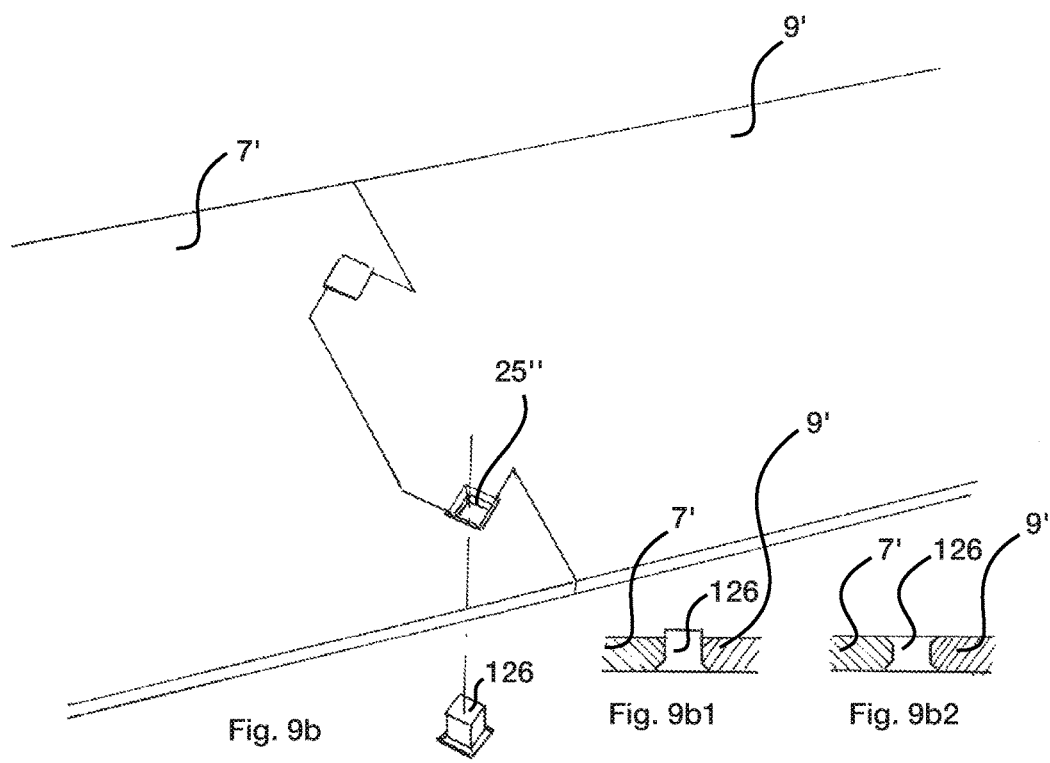
Figure 10:
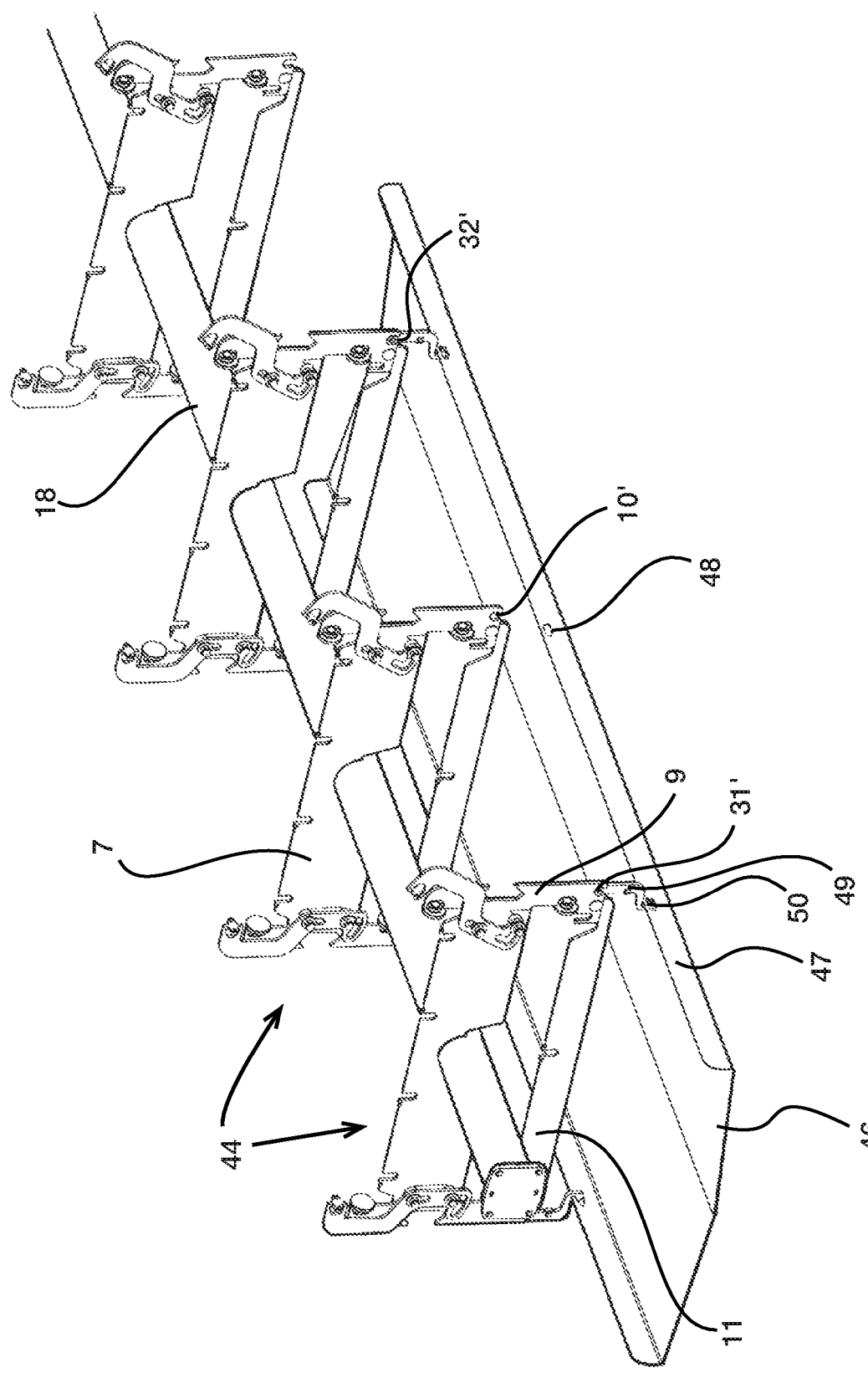
Figure 11:
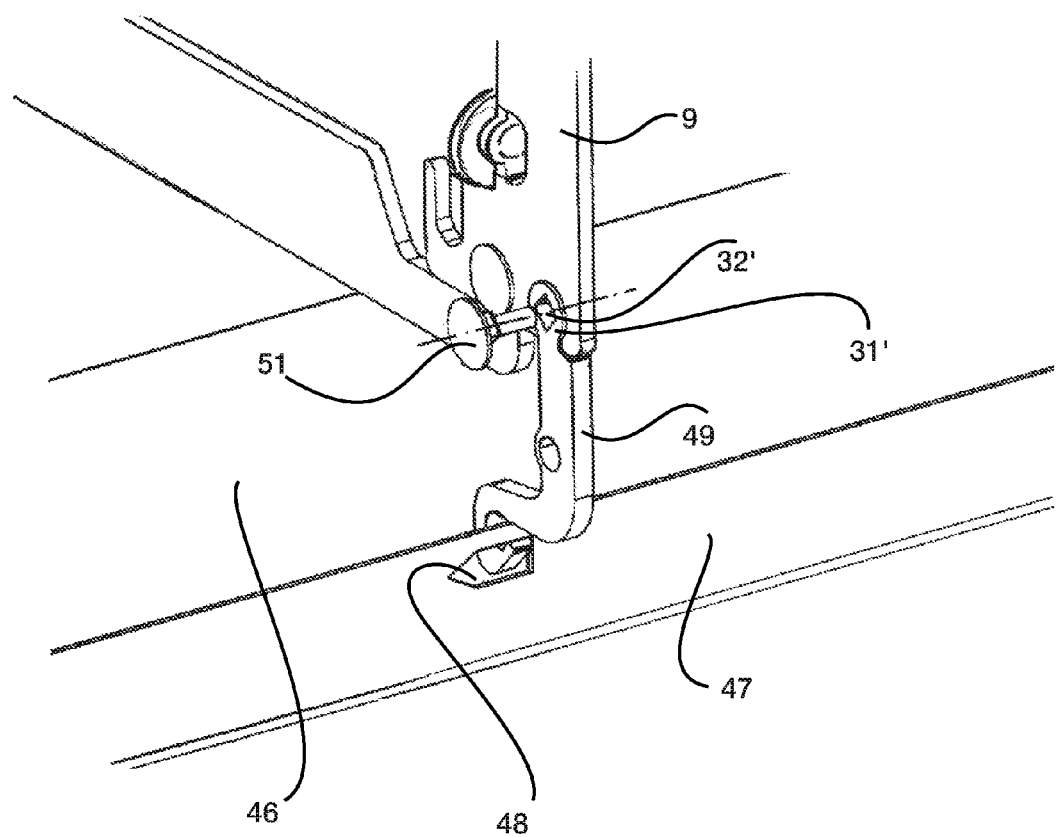
Figure 12:
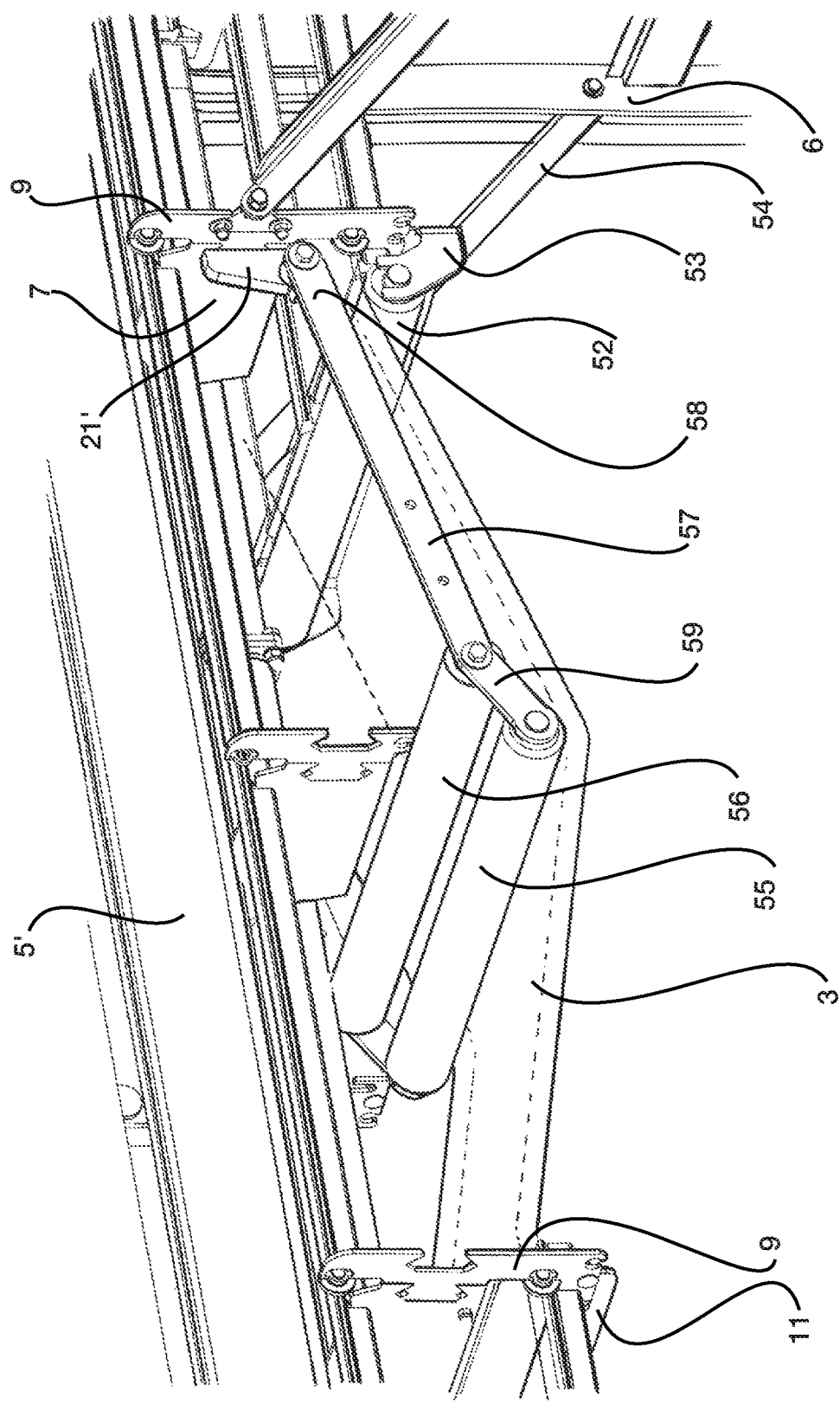
Figure 13:
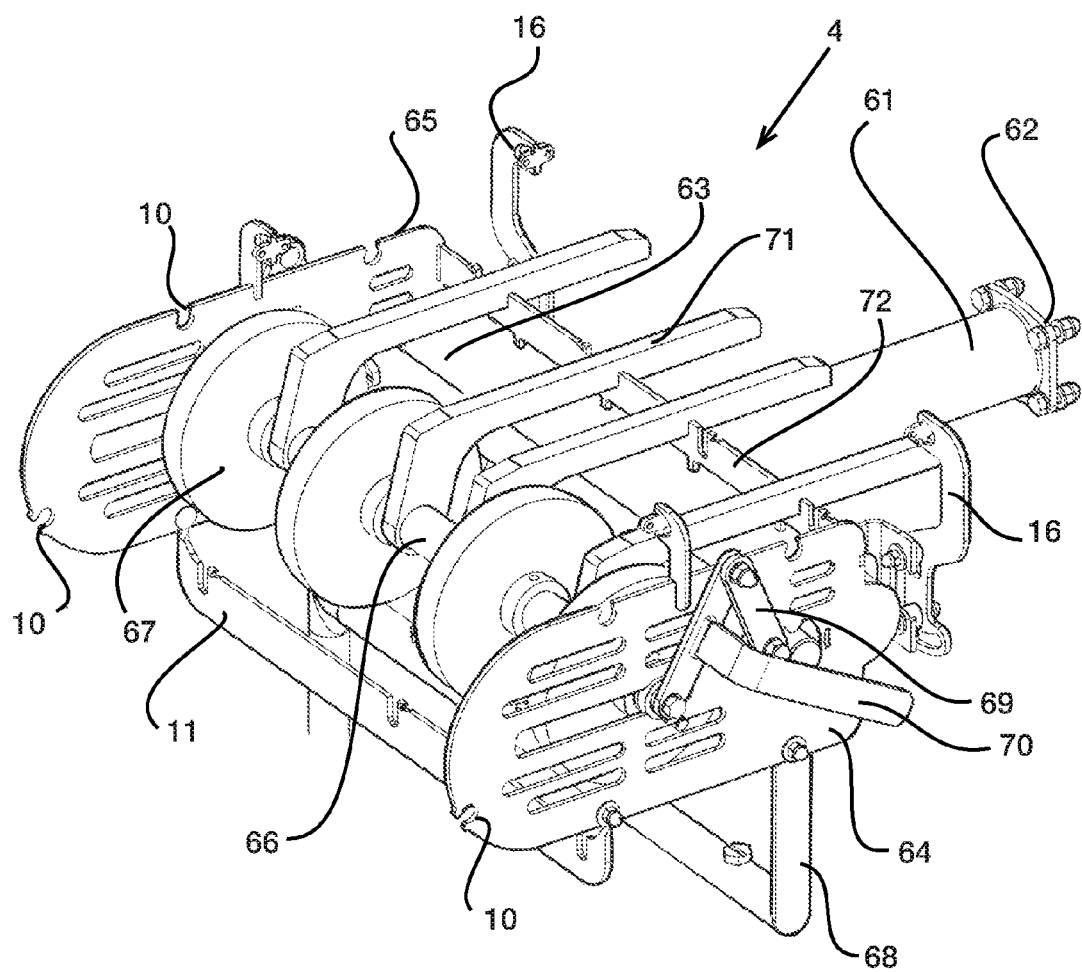
Figure 14:
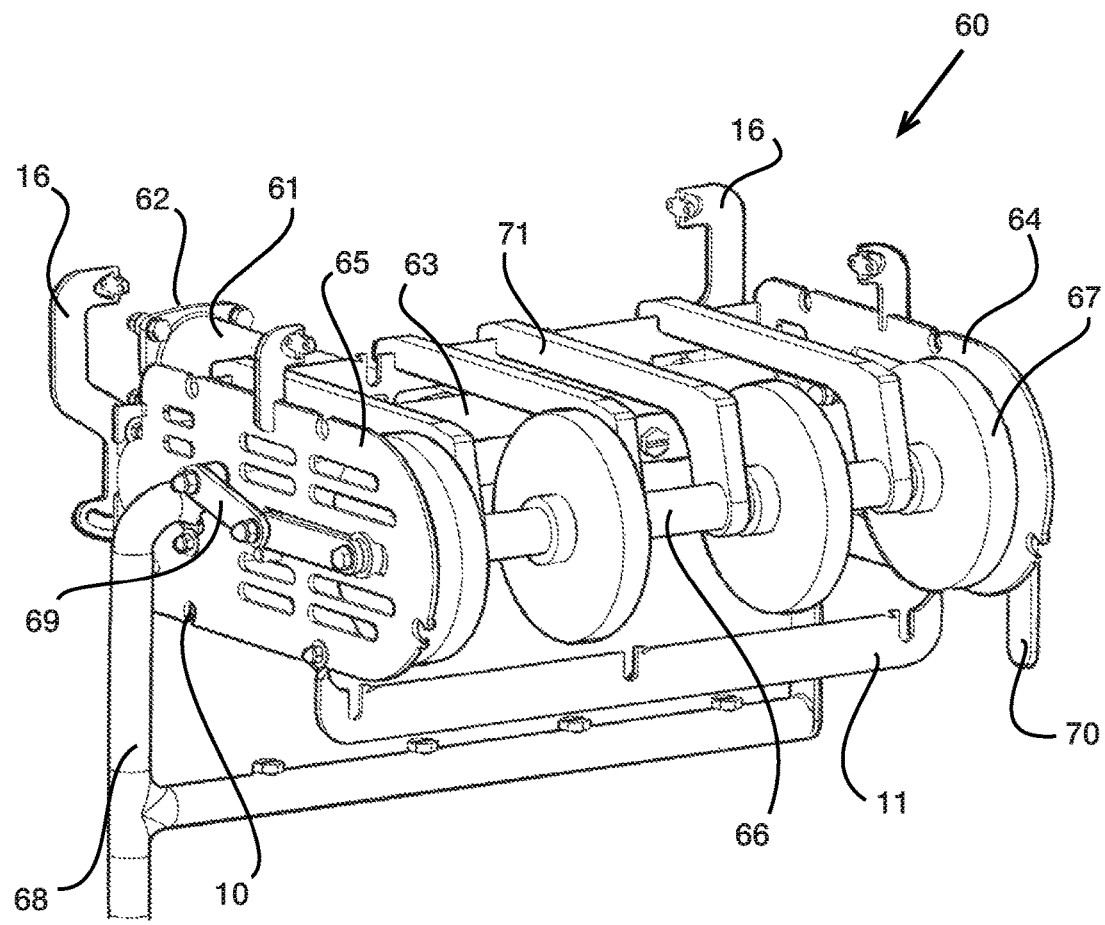
Figure 15:
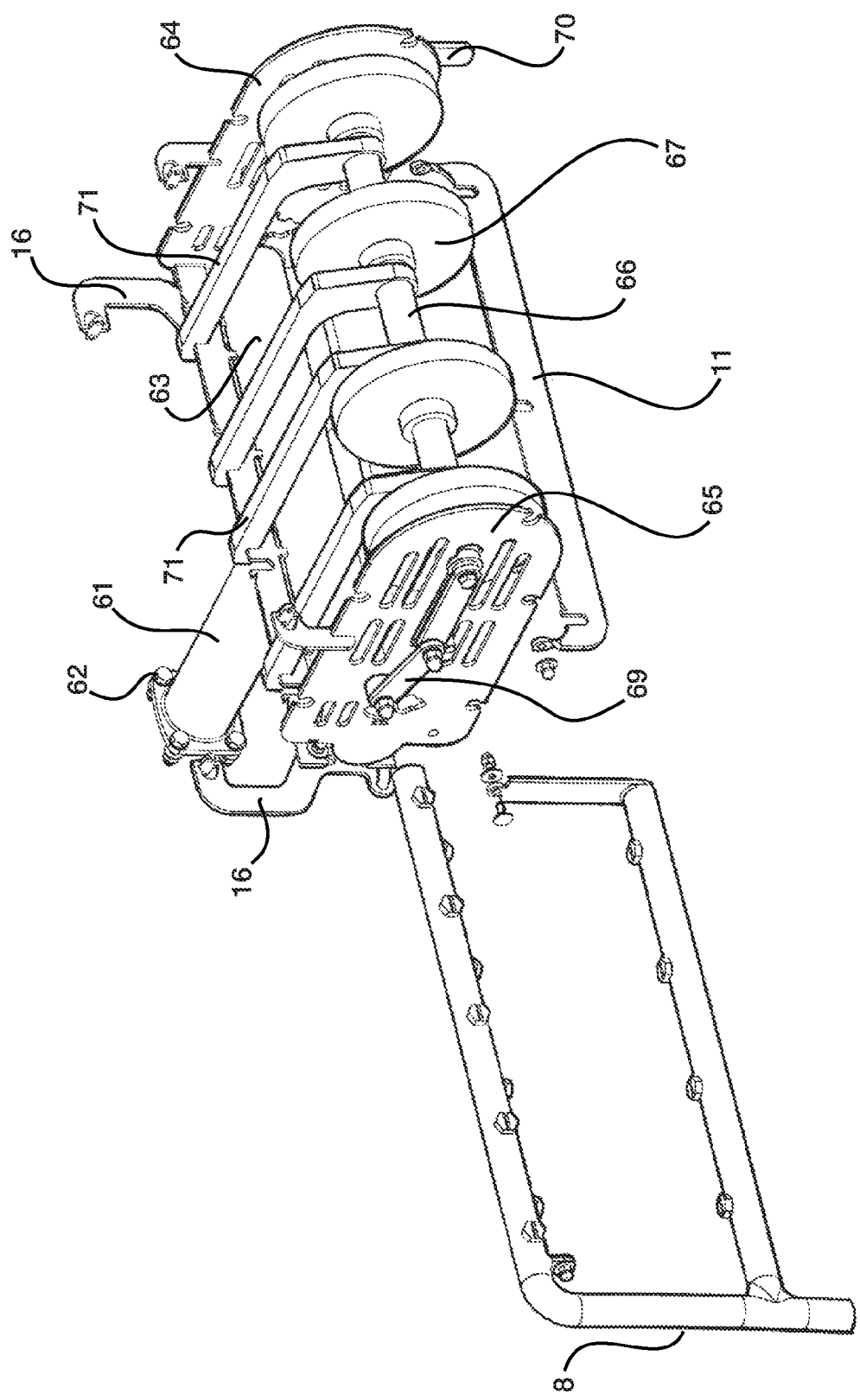
Figure 16:
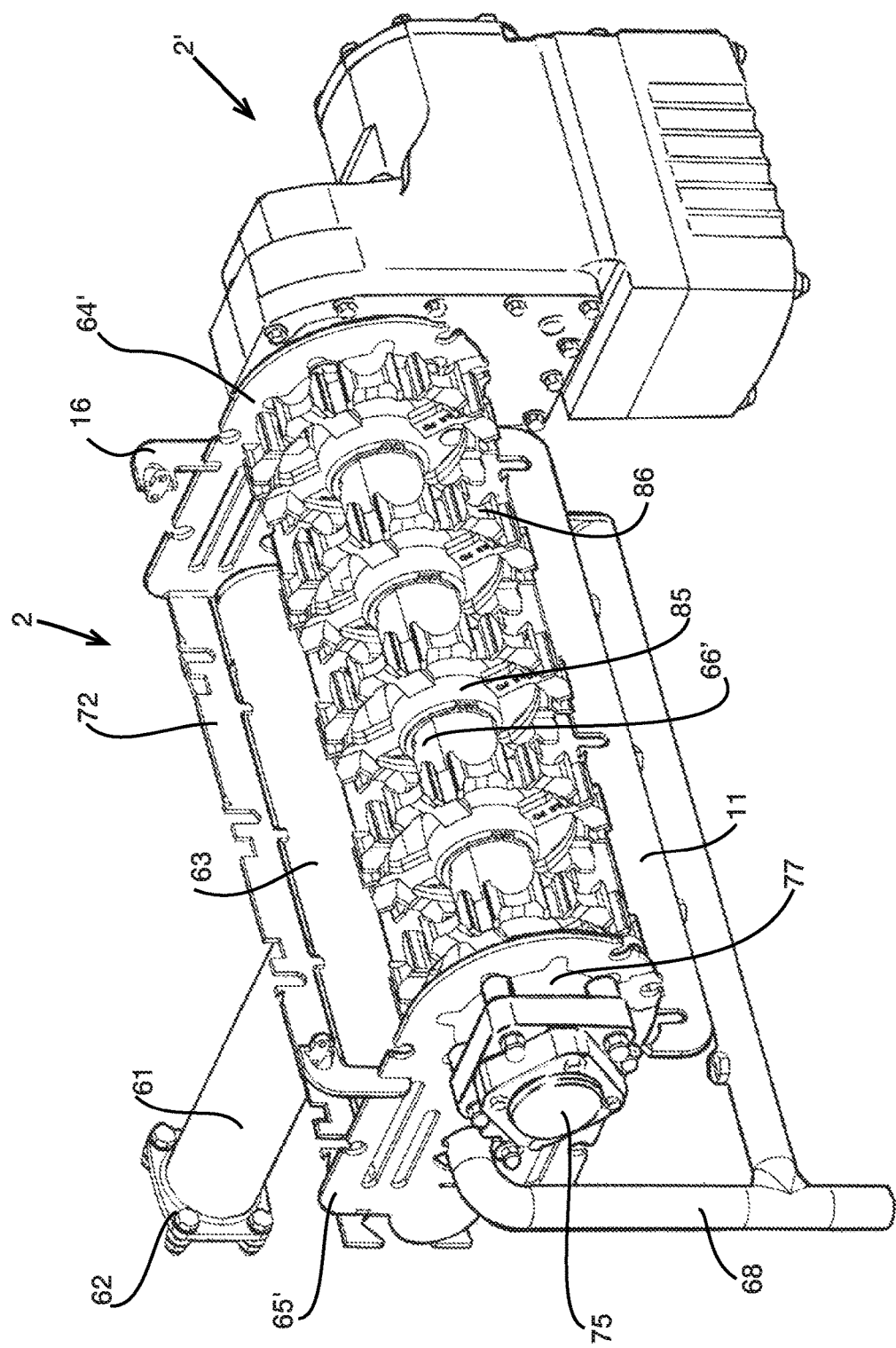
Figure 17:
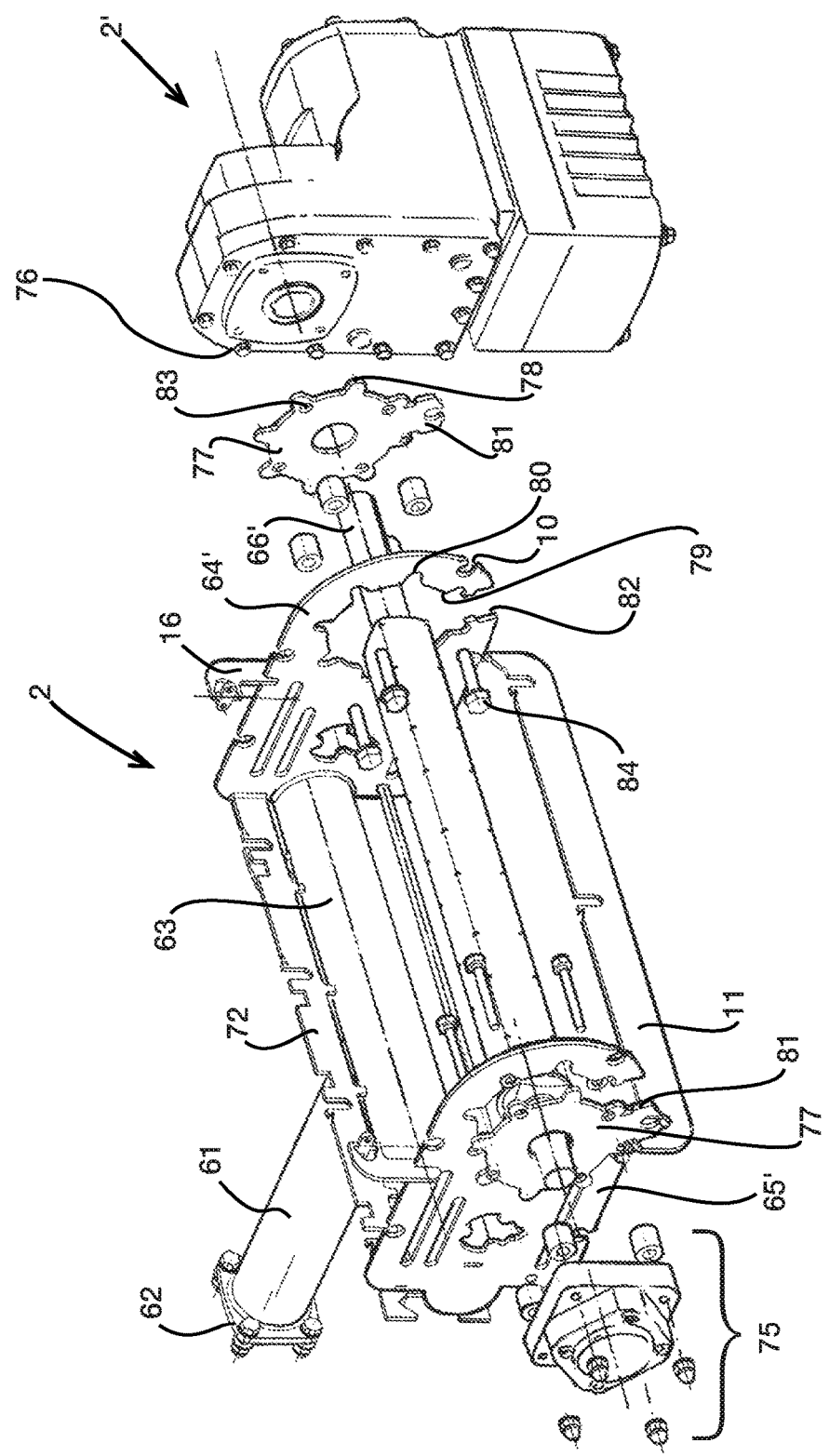
Figure 18:
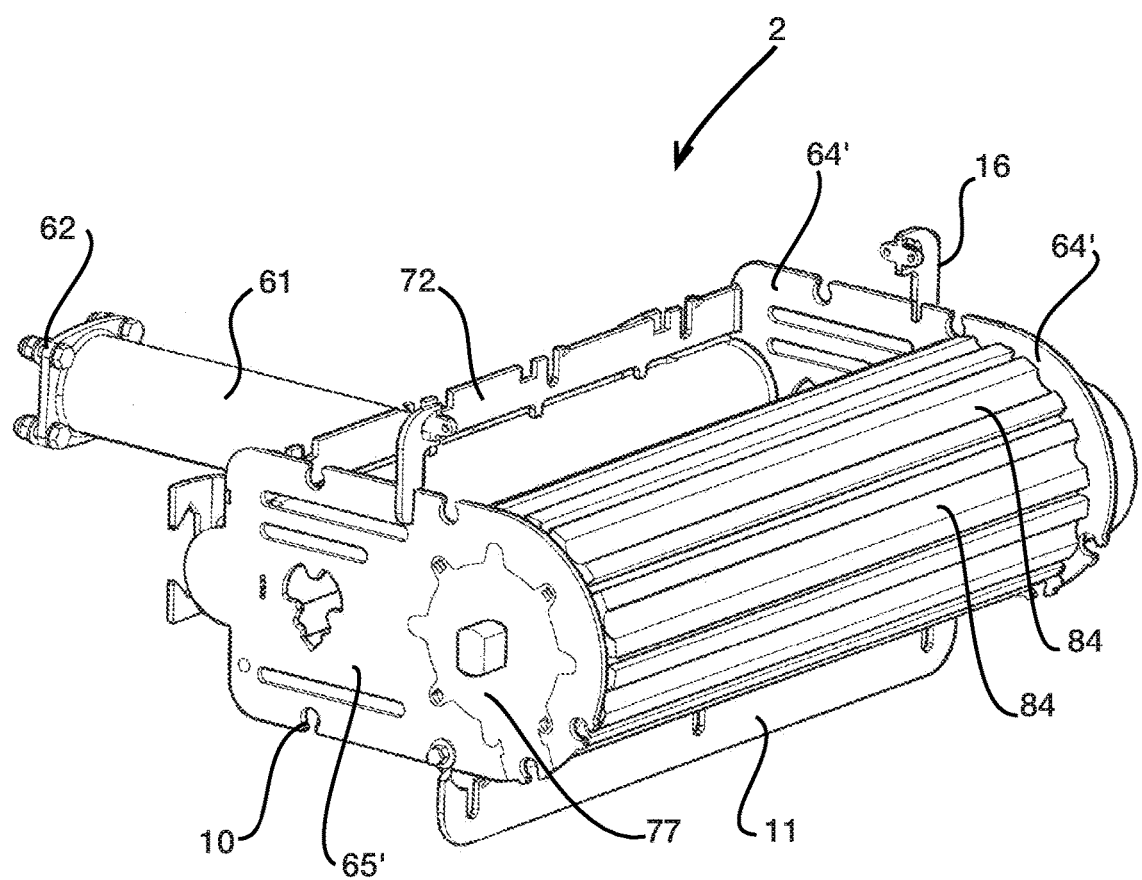
Figure 19:
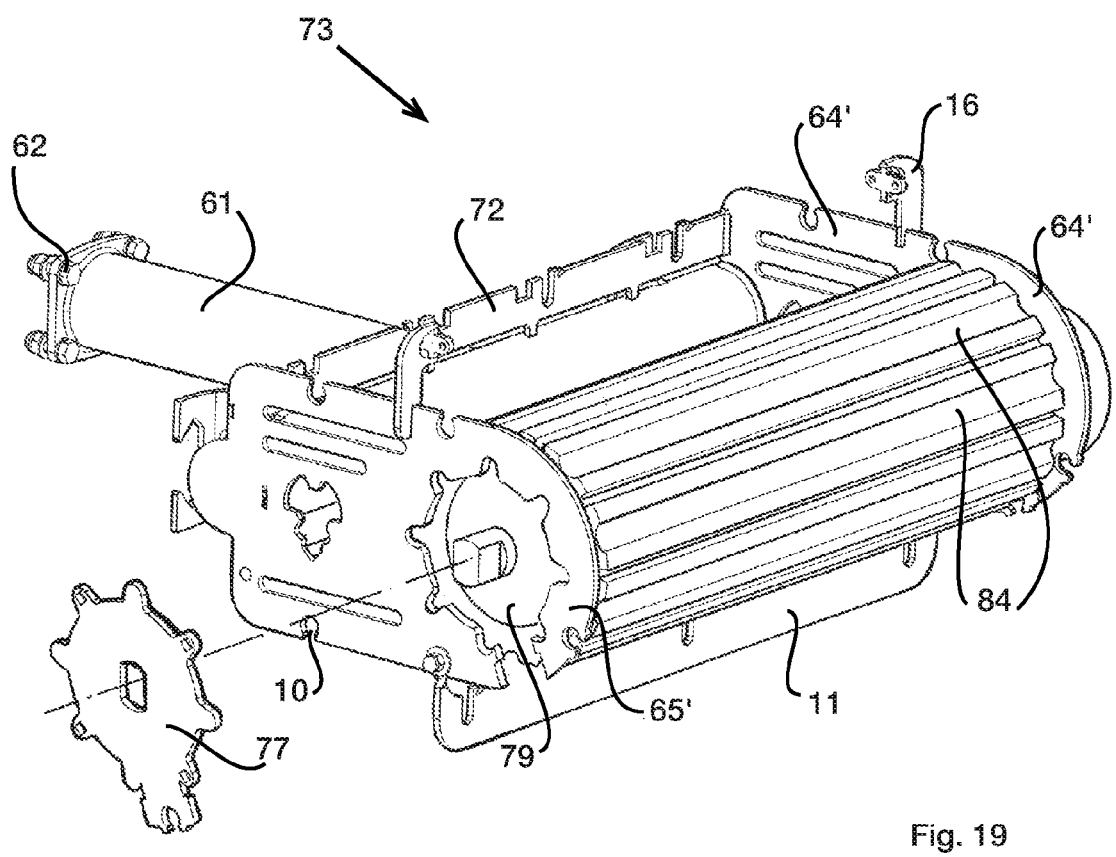
Figure 20:
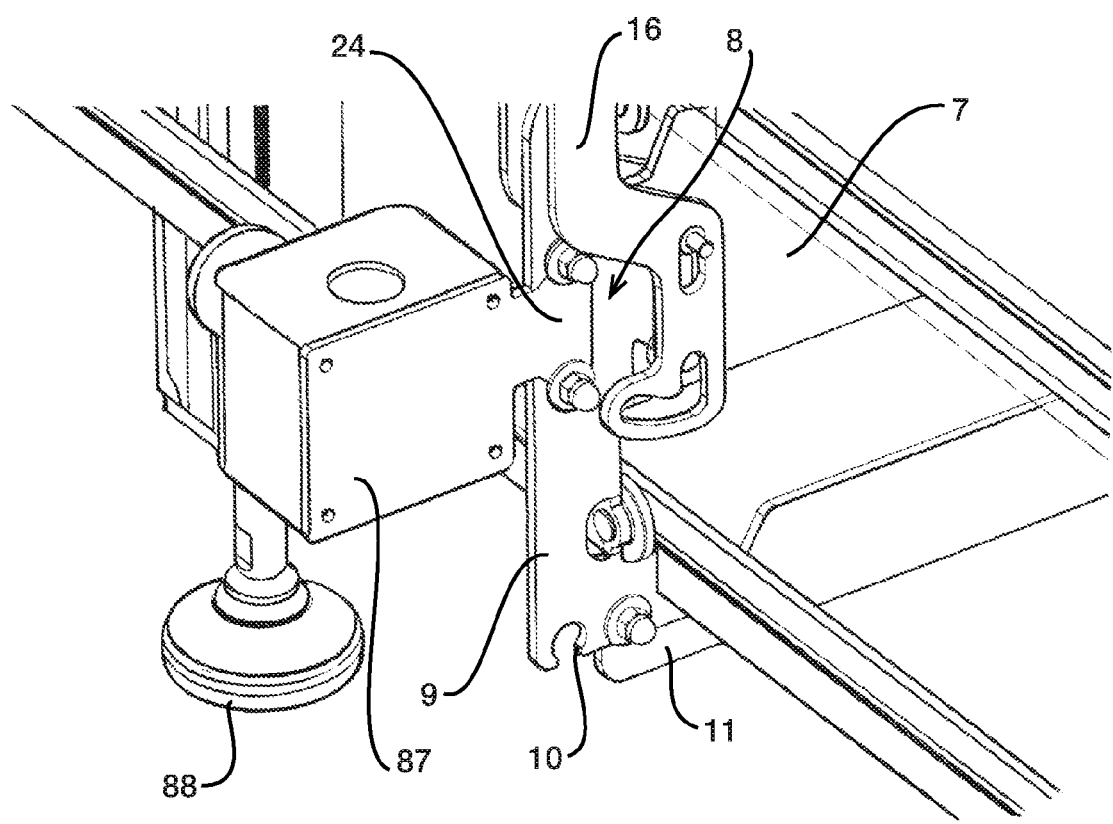
Figure 21:
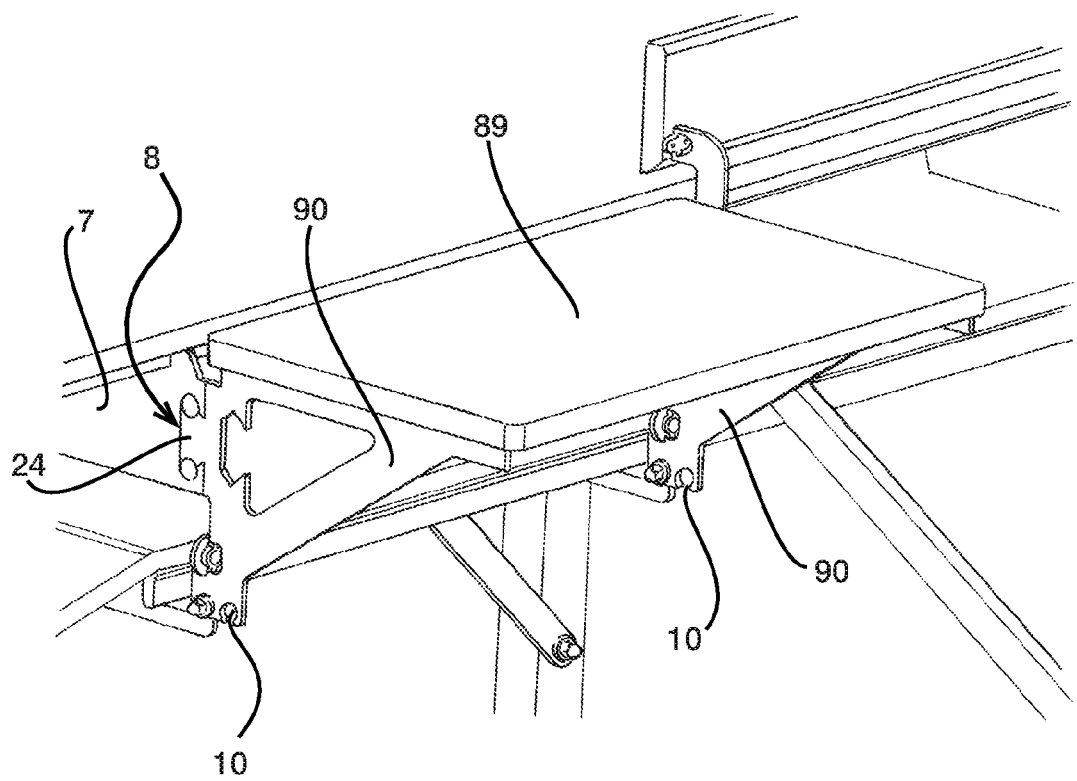
Figure 22:
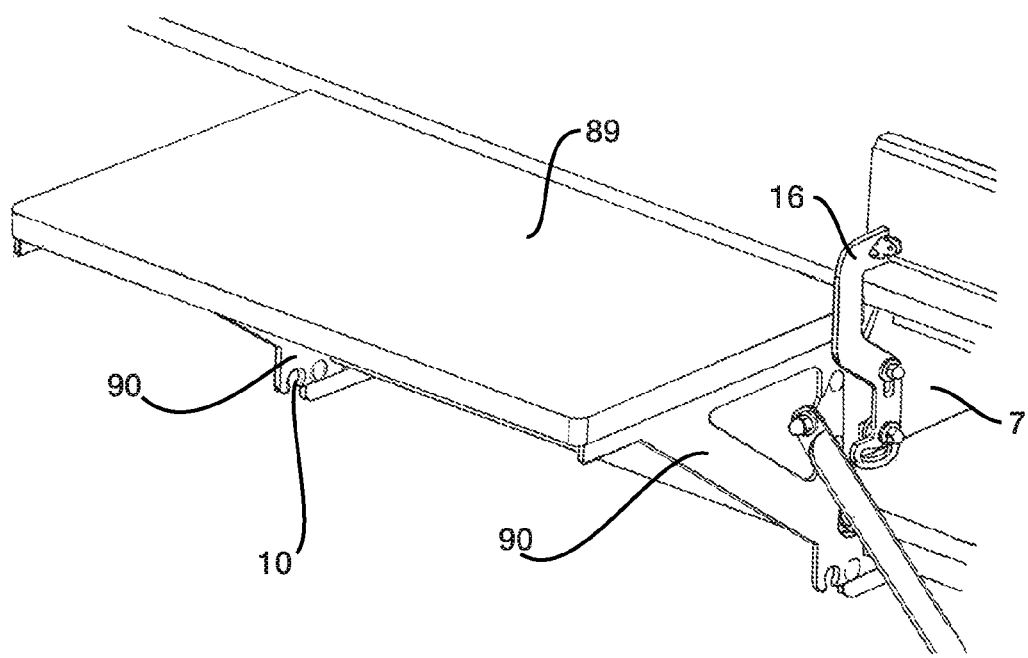
Figure 23:
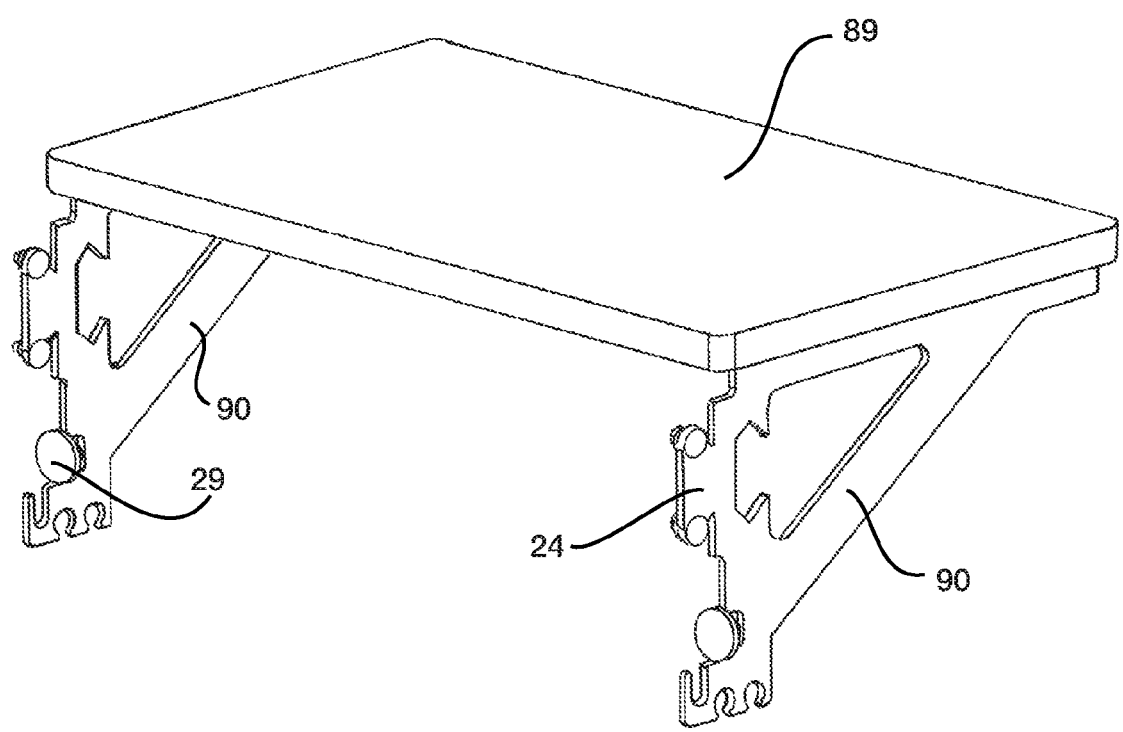

FIG. 9b1/9b2 show a cross section through FIG. 9b;

FIG. 10 shows a drip tray arrangement;

FIG. 11 shows a detail of the drip tray arrangement according to FIG. 10;

FIG. 12 shows a conveyor belt tensioning mechanism;

FIG. 13 shows details of the non-driven pulley end of a conveyor system of FIG. 2;

FIG. 14 shows a different view of the non-driven pulley end of a conveyor system of FIG. 13;

FIG. 15 shows the non-driven pulley end of a conveyor system of FIG. 14 with a cleaning nozzle arrangement removed from the pulley assembly;

FIG. 16 shows details of a driven pulley end of the conveyor system;

FIG. 17 shows an exploded view of the driven pulley end of FIG. 16;

FIG. 18 shows details of the non-driven pulley end of a conveyor system according to a further embodiment of the invention;

FIG. 19 shows the non-driven pulley end of a conveyor system of FIG. 18 with an intermediate plate removed from the pulley assembly;

FIG. 20 shows a human interface module attachment to an attachment plate;

FIG. 21-23 show a table attached directly to the shape fitting connection of a cross member plate.

Figure 24:
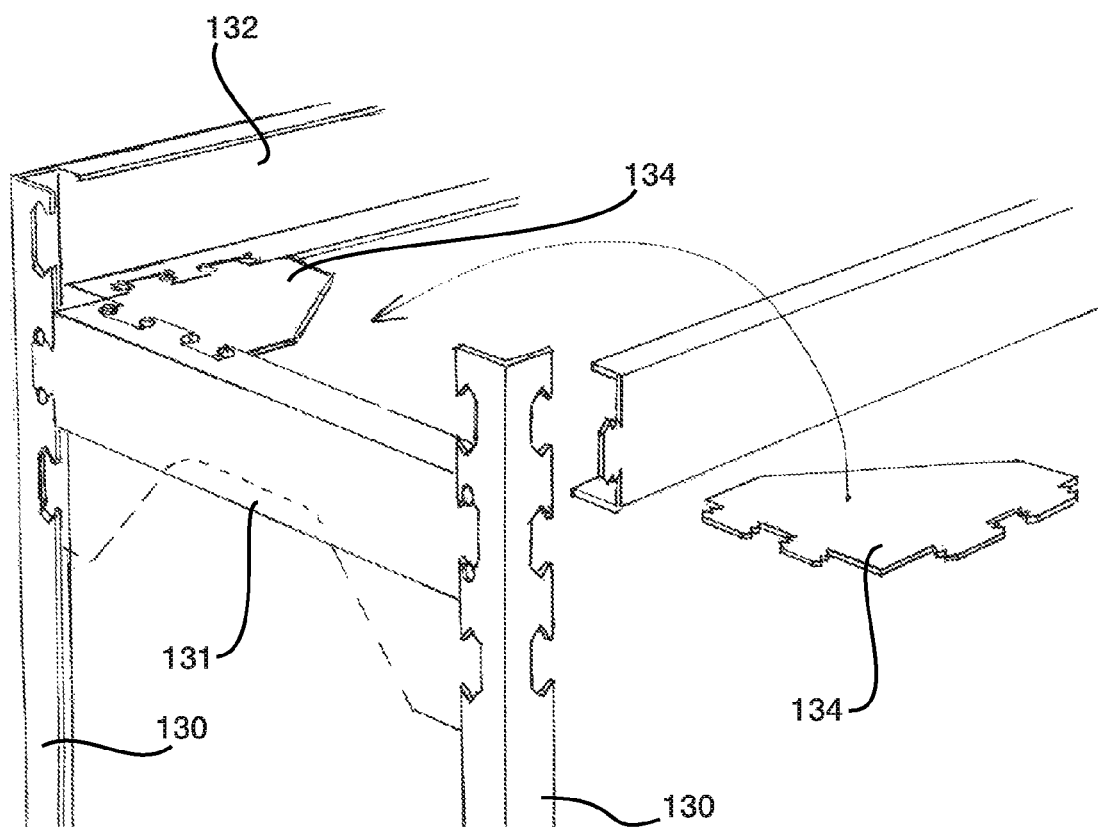

FIG. 24 shows an alternative embodiment of a support structure according to the invention.

FIG. 1 schematically depicts a conveyor system 1 according to the invention. An endless conveyor belt 3 is moveable using a motor drive 2' and looping over a driven pulley end 2 with the motor drive 2' and over a non-driven return pulley end 4. The conveyor rests on legs 6 and has side guides 5 for containing products on the belt 3.

Figure 3:
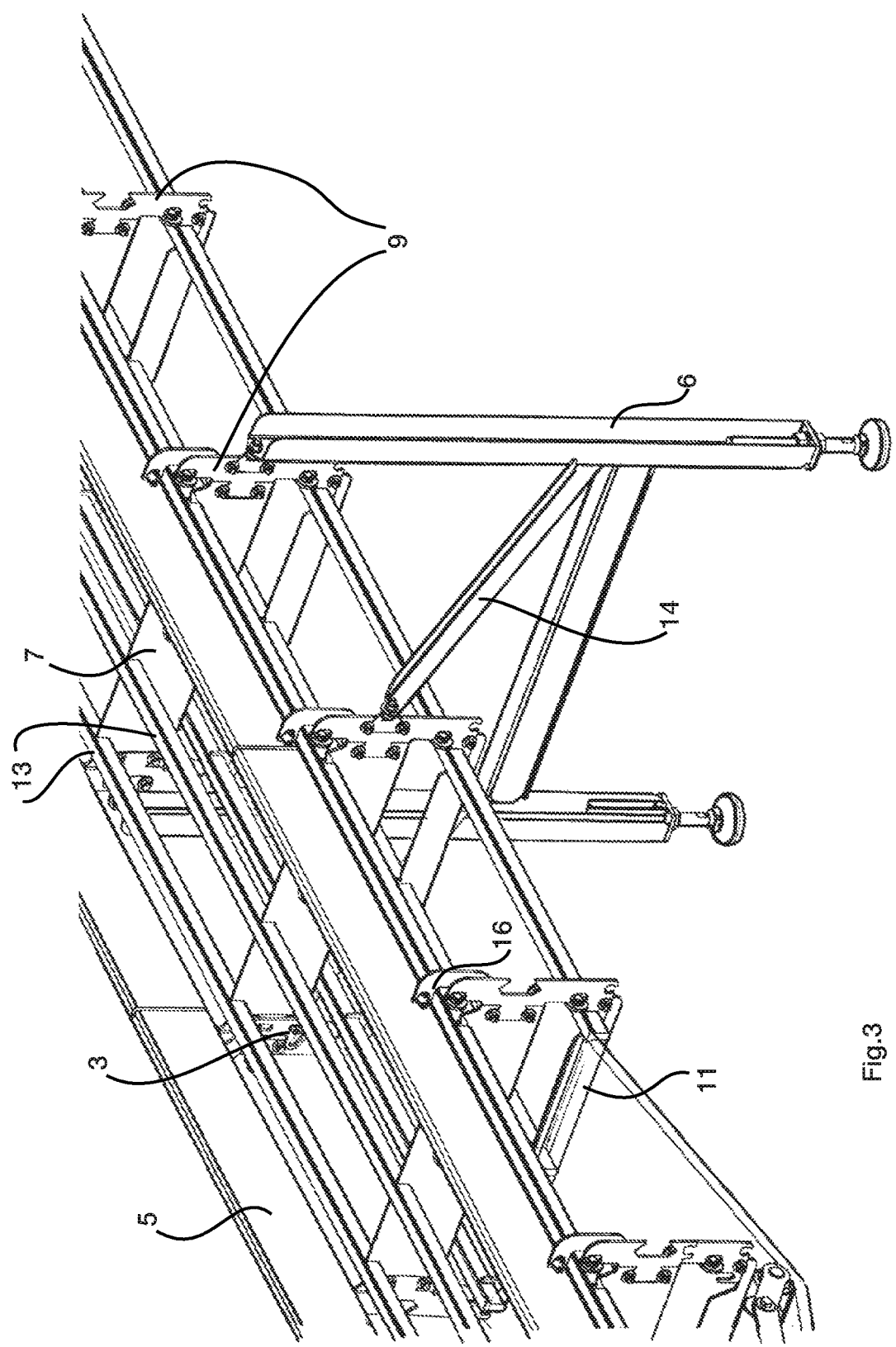
FIG. 3 shows a part of the conveyor system of FIG. 1 illustrating an embodiment of leg attachment.

FIGS. 2 and 3 show more details of the non-driven pulley end 4 of the conveyor system of FIG. 1. Plate-shaped support elements further indicated as cross member plates 7 are arranged transversely to the travel direction of the conveyor belt 3 and have shape fitting connections 8 to fasten other plate-shaped support elements further indicated as attachment plates 9 to one or more edges of the cross member plates 7. The attachment plates 9 have attachment points 10 for attaching other plate-shaped support elements further indicated as return conveyor plates 11 across two opposite attachment plates 9 also using shape fitting connections. The shape fitting connections will be described later referring in particular to FIGS. 7a-8b. The cross member plates 7, the attachment plates 9 and the return conveyor plates 11 as shape fittingly engaging each other constitute a support structure and are each made of stainless steel, making the support structure in particular suitable for use in the food industry. Dependent on the environment and the particular use of the conveyor system 1, also other materials may be used, such as titanium or polymers. The thickness of the plates is 3 mm and in general depends on the material of the plate-shaped support elements 7, 9, 11 as well as the required load capacity for the support structure.

The return conveyor plates 11 have holders for return conveyor support bars 12 to support the lower return conveyor belt loop of belt 3. Similarly, the cross member plates 7 have holders for conveyor support bars 13 to support the upper conveyor belt loop of belt 3. Cross bars 14 may be attached to attachment plates 9 to further support the legs 6 by stretching from an attachment plate 9 to a leg 6 connected to an adjacent attachment plate 9. The attachment plates 9 may further have pivotable attachments 15 to hold a side guide holder 16 of the side guides 5 pivotably moveable between a guide position, in which the side guide 5 is in a position proximate the conveyor belt, and a tilted away position, designated by 5' in FIG. 2, where the side guide is tilted away from the conveyor belt 3.

Figure 4:
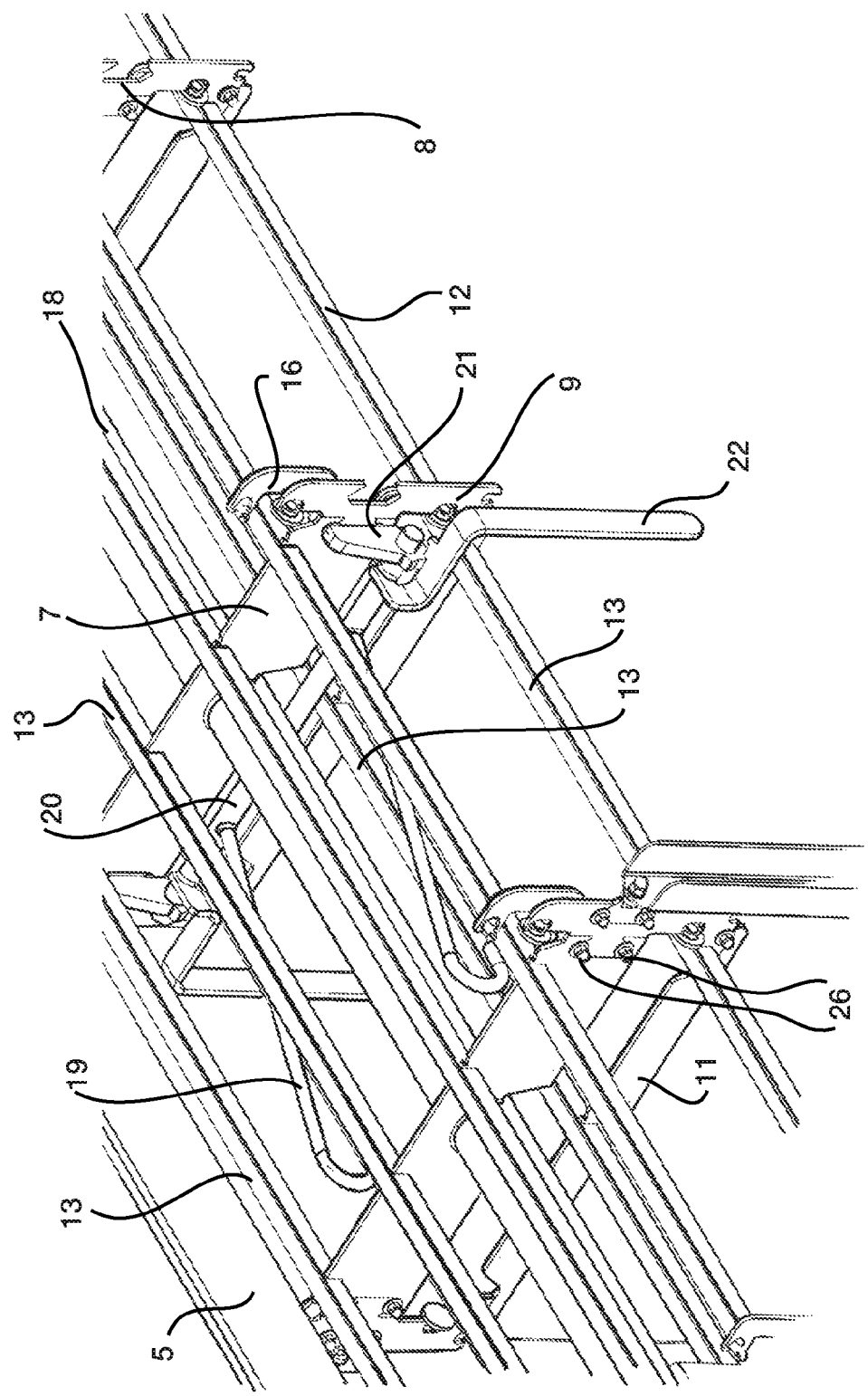
FIG. 4 shows a detail of FIG. 3.

FIG. 4 shows details regarding lifting bars 19 as well as more details regarding the shape fitting connections 8. A longitudinal rail 18 onto which the cross member plates 7 are fastened is also visible in FIG. 4. The lifting bars 19 are fixed to an axle 20, which is pivotally held to a cross member plate 7 by a pair of bearing blocks 21. The bearing blocks 21 are advantageously provided with threaded holes aligned with the holes shaped by the shape fitting connection 8 between the cross member plate 7 and the attachment plate 9. Clamping a cross member plate 7 and an attachment plate 9 together using a threaded screw thus securely attaches the bearing block 21 to the cross member plate 7 whilst using the bearing block as one part of the clamp. A lever 22 is fastened to the axle 20, enabling the manual rotation of the axle 20 to, in turn, engage the lifting bars 19 to lift the conveyor belt 3 (not shown).

Figure 7A:
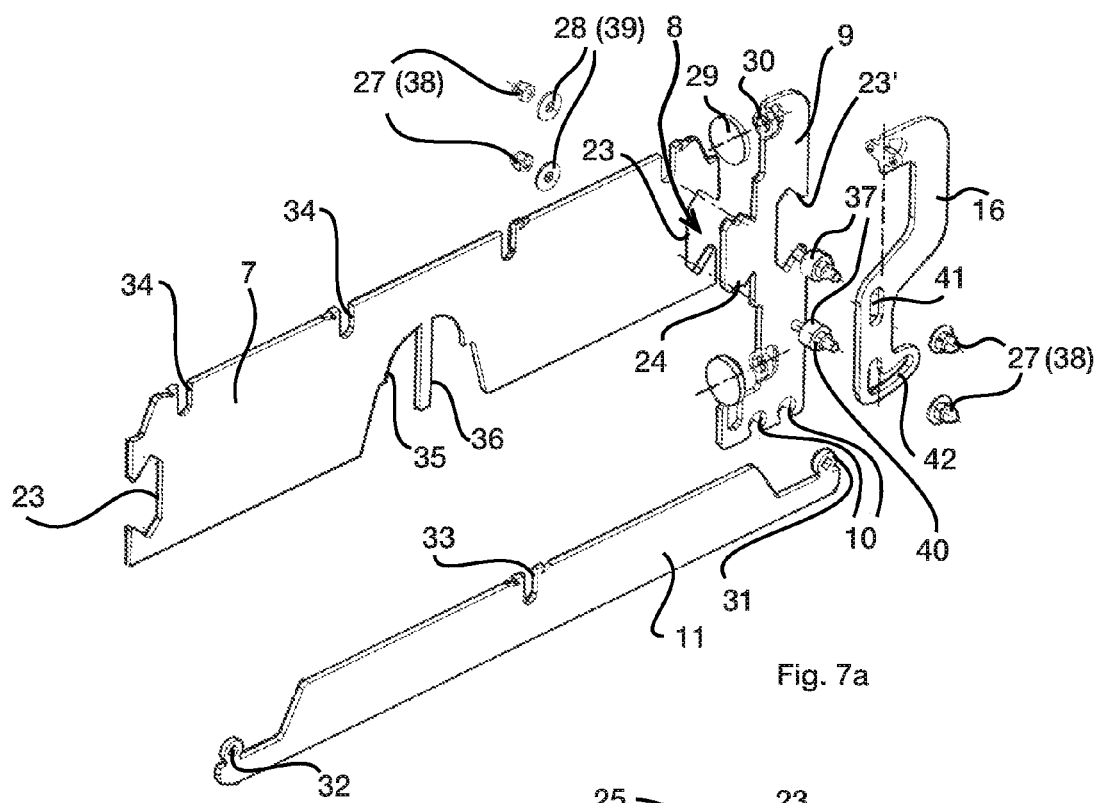
FIG. 7a shows a cross member, an attachment plate and a return conveyor bar.
Figure 7B:
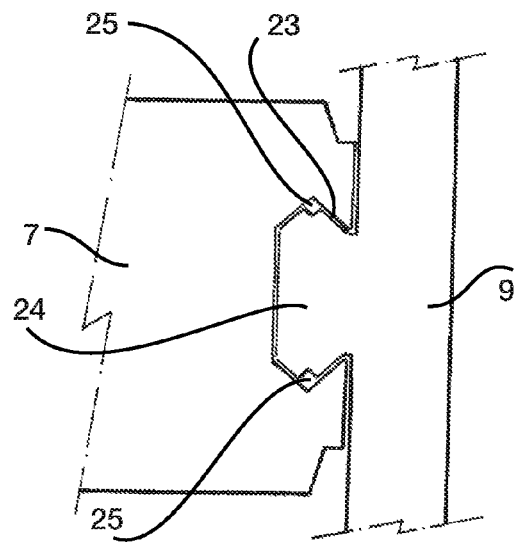

Referring to FIG. 7a, the shape fitting connection 8 has a shaped slot 23 of the cross member plate 7 arranged to cooperate with a shaped protrusion 24 of an attachment plate 9 to engage each other in a shape fitting way and to form two passages or holes 25 (see FIG. 7b). Each hole 25 cooperates with a removable fastener to clamp the cross member plate 7 and the attachment plate 9 together. The fastener may be a nut 27 and screw 26 combination, optionally using washers 28. Any suitable removable fastener may be used. In case the conveyor system 1 is to be used in the food industry, it will be required that it fulfills the demands of food safety and corrosion resistance.

The attachment plate 9 may further have conveyor belt side supports 29 held by side support fasteners 30, for example a protrusion (not shown) on the side support 29 pressed into a circular hole making up the support fastener 30. The side supports 29 are advantageously made from a low friction material such as hard plastic material. The return conveyor plates 11 may be fastened to the attachment plates 9 by a protrusion 31 of the return conveyor plate 11, which protrusion 31 have a through hole 32, the protrusion 31 cooperating with a similarly shaped slot 10 arranged on the attachment plate 9. A removable fastener similar to what has been described for clamping the cross member 7 to the attachment plate 9 may be used, cooperating with the through hole 32 to clamp the protrusion 31 to the shaped slot 10, for example (not shown) between a screw 26 and a nut 27, optionally using washers 28. Clearly the diameter of the head of the screw 26 as well as the diameter of the nut 27 or of the washer 28 should be larger than the diameter of the protrusion 31.

The return conveyor bars 11 may further have return conveyor support bar slots 33 for holding conveyor support bars 13 (see FIG. 4) for the lower return conveyor belt loop of belt 3 (not shown). Similarly, the cross member plate 7 may have conveyor support bar slots 34 for holding supports 13 (see FIG. 4) for the upper conveyor belt loop of belt 3 (not shown). Further, the cross member plates 7 may have a cut-out 35 having a shape corresponding to the profile of the longitudinal rail 18 (see FIG. 4) to facilitate the positioning of a cross member plates 7 relative to the longitudinal rail. The cross member plates 7 are attached to the longitudinal rail 18, for instance by welding. A plurality of longitudinal rails 18 may be used in parallel (not shown), necessitating the use of a corresponding plurality (not shown) of cut-outs 35. To ascertain a correct positioning in longitudinal direction along the longitudinal rail 18, a protruding finger 36 may be arranged, preferably centrally, in the cut-out 35. The finger 36 is insertable into an alignment hole (not shown) arranged in the longitudinal rail.

The attachment plates 9 may further have pivotable attachments 15 (see FIG. 2) to hold the side guide holder 16 pivotably moveable as described above. The pivotable attachments may comprise distance elements 37 having threaded ends to cooperate with nuts 38 and optionally washers 39. Each distance element has a waist portion 40 which is adapted to slide in a first slot 41 and a second slot 42, both arranged in the side guide holder 16. The first slot may be linear and the second slot may be substantially L-shaped so that the side guide holder may be lifted straight up, with respect to the general plane of the conveyor belt (not shown), until the lower of the two distance elements 37 hits a bottom edge of the second slot 42, whereafter the top of the side guide holder may be tilted away from the conveyor belt whilst pivoting about the upper of the two distance elements.

Figure 8A:
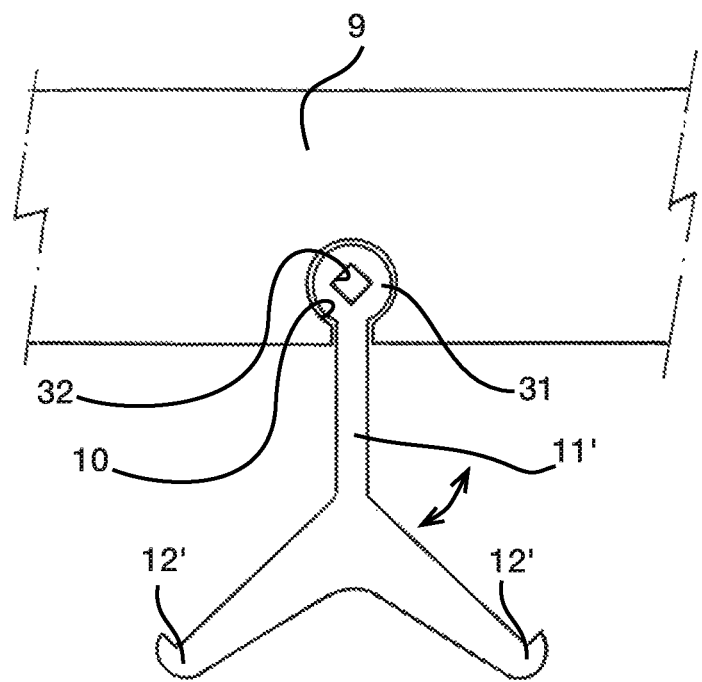
FIG. 8a shows in connected condition a shape fitting connection as can be used within the context of the invention.
Figure 8B:
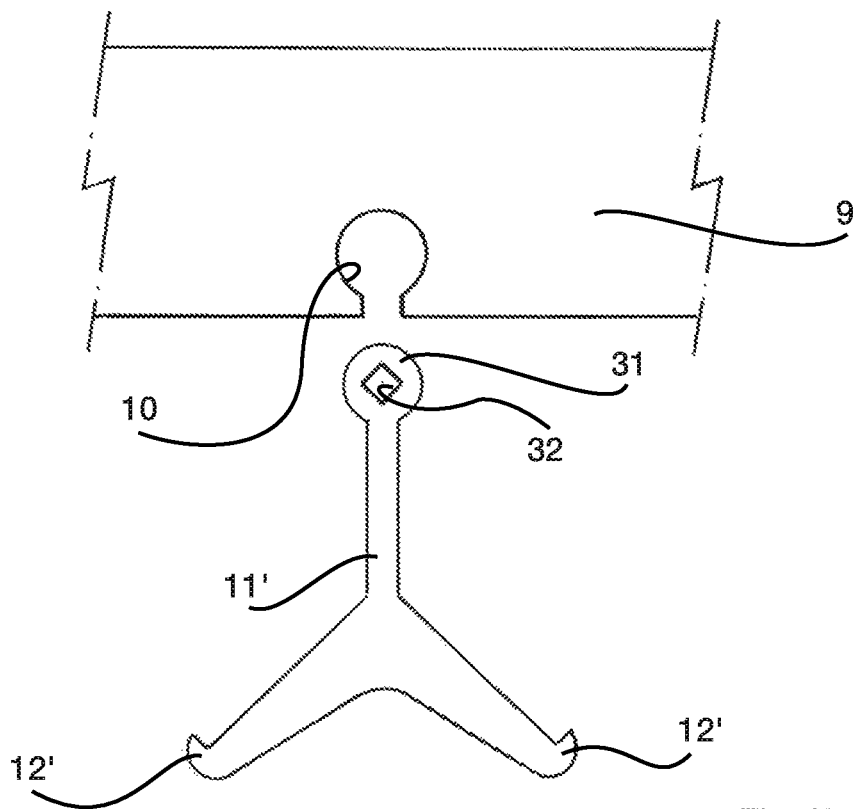
FIG. 8b shows FIG. 8a in unconnected condition.

FIGS. 8a and 8b show a further embodiment of an attachment of a basically circular protrusion 31 in an attachment plate 11' to a similarly shaped slot 10, protrusion 31 having an unround through hole 32 and cooperating with the shaped slot 10 arranged on the attachment plate 9, or any other suitable plate of the conveyor system (see FIGS. 11 to 21). The shown attached attachment plate 11' may have a plurality of hooks 12' or similar for attaching further items.

Figure 9C:
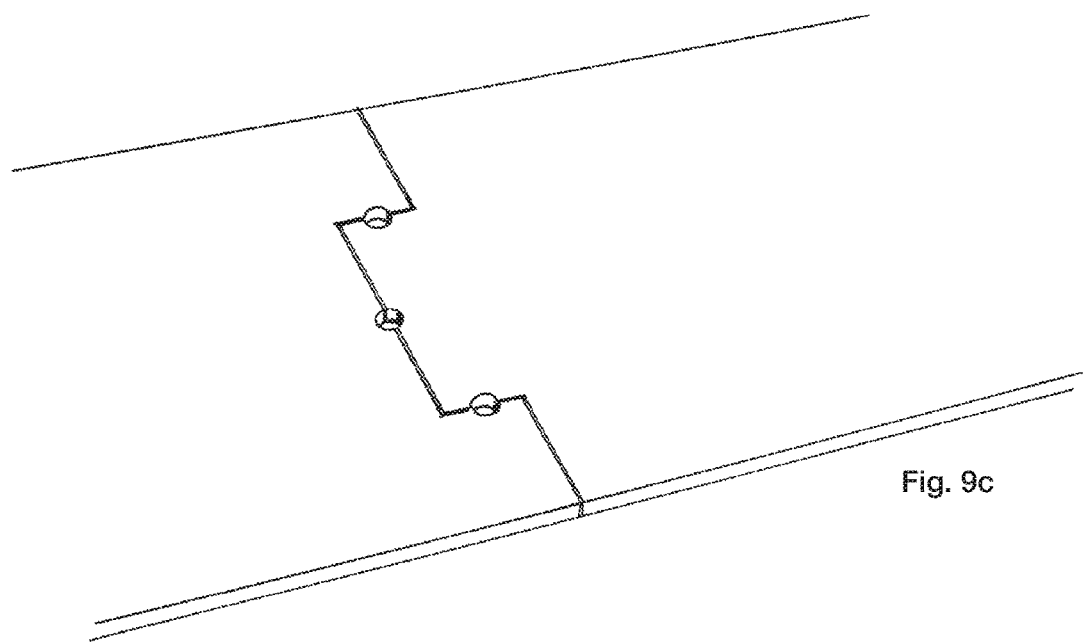
Figures 9D, 9E:
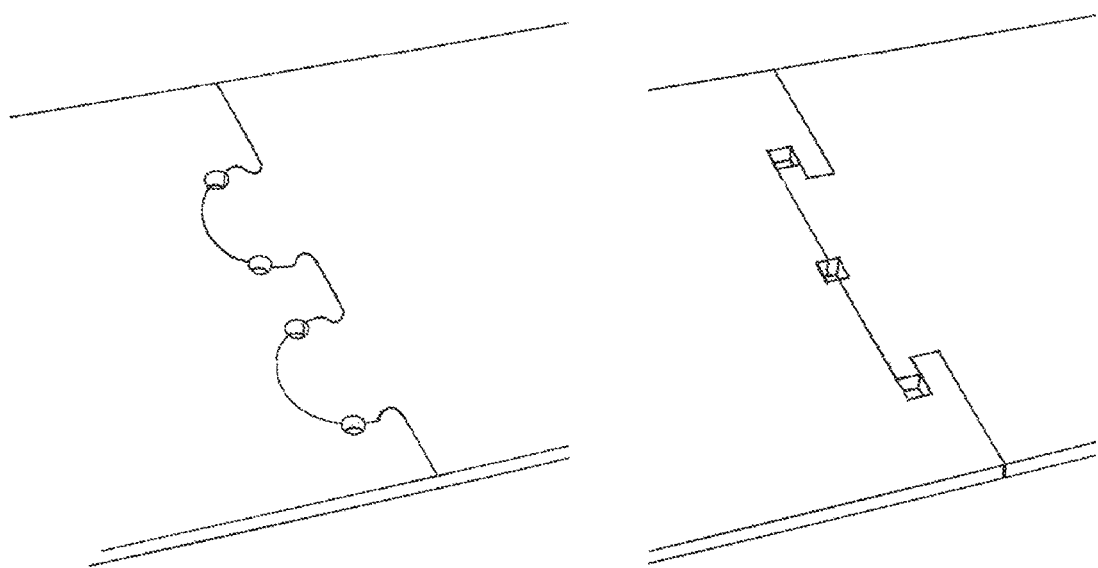

FIGS. 9a to 9e show different alternative embodiments of shape fitting connections as can be used within the context of the present invention. The embodiment according to FIG. 9a basically corresponds to the embodiment according to FIG. 7a. FIG. 9a1 shows how in stead of holes 25 with a square cross section, also round holes 25' could be used. The embodiment according to FIG. 9b differs from the embodiment according to FIG. 9a in that the holes 25" are widened at the surface of the plate-shaped support elements 7', 9'. As connecting elements rivets 126 are used, the length of which in use is limited to the thickness of the support elements 7', 9'. This way no part of the connecting element 126 projects outside the thickness of the support elements 7', 9'. FIGS. 9c to 9e show further embodiments which will be clear to the skilled person without further elucidation. In a further alternative embodiment (not shown), it is also possible to make use of a separate passage or hole in one or both of the support elements just beside the circumference of the support element in question. The hole is then not formed by the respective circumferences of the support elements.

Figure 5:
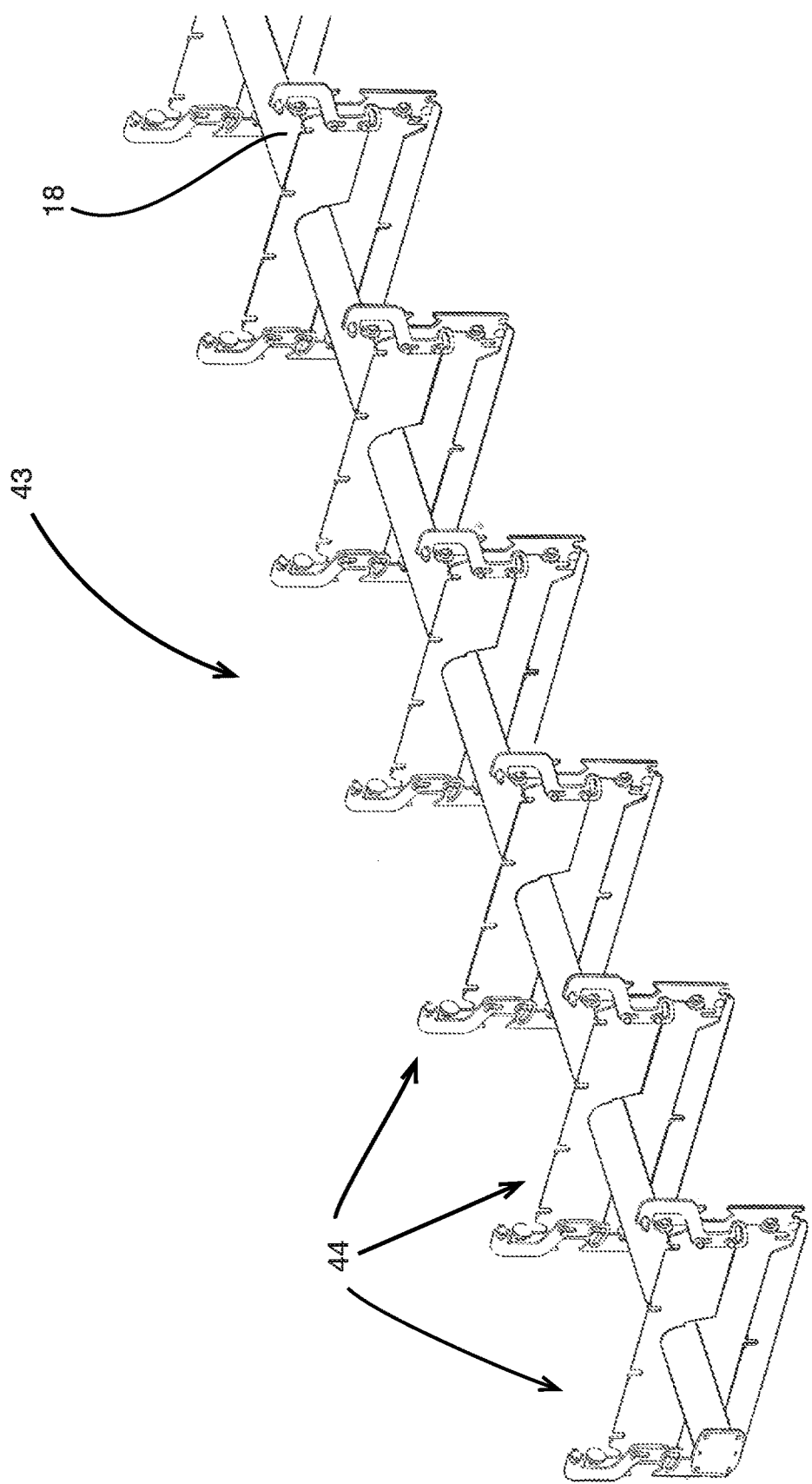
FIG. 5 shows cross members of the conveyor system mounted on a system of a linear section longitudinal rail.
Figure 6:
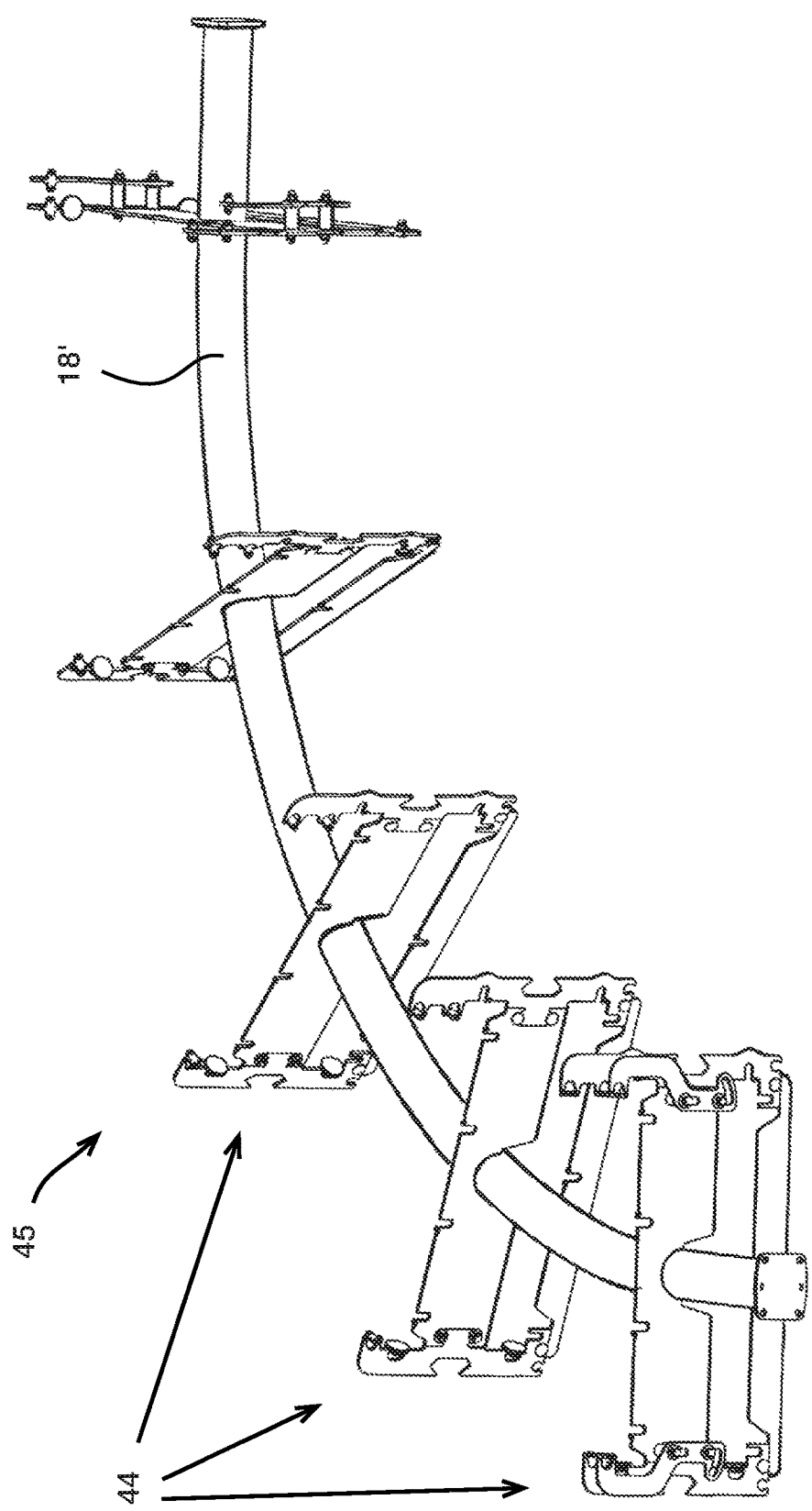
FIG. 6 shows cross members of the conveyor system mounted on a curved section of a longitudinal rail.

FIGS. 5 and 6 respectively show parts of a linear section 43 and a curved section 45 of the conveyor system. The substantially linear longitudinal rail 18 of FIG. 5 has a plurality of conveyor belt support assemblies 44 attached at regular intervals in longitudinal direction of the rail. Each support assembly generally comprises fastened together one cross member plate 7, one return conveyor plates 11 and two attachment plates 9 arranged at distal ends of the cross member 44. Similarly, the curved longitudinal rail 18' of FIG. 6 has a plurality of conveyor belt support assemblies 44 attached at regular intervals in longitudinal direction of the rail.

FIGS. 10 and 11 show an embodiment of the invention of a drip plate 46 having edges 47 provided with holes 48 that cooperate with hooks 49 fastenable to the attachment plate 9 using an arrangement similar to what has been described earlier for attachment of the return conveyor plate 11 to the attachment plates 9. A protrusion 31' arranged on an upper end of the hook 49 has a through hole 32'. The protrusion 31' cooperates with a similarly shaped slot 10' arranged on the attachment plate 9. The thickness of the hook 9 is smaller than the thickness of the attachment plate, and the opening of the slot 10' at the edge of the attachment plate is larger than a waist of the protrusion 31', making it possible for the hook to pivot about the fastener 51 arranged in the slot 10' to facilitate attaching a hook end 50 of the hook 49 to the hole 48.

FIG. 12 shows an embodiment of the invention where a return conveyor belt tensioning device is fastened to the conveyor system framework. The lower return conveyor belt loop of belt 3 runs over a support roll 52 fastened to the attachment plates 9 via roll holders 53. The roll holders are fastened to the attachment plates in a similar way as the return conveyor plate 11 (see above). Support legs 54 may be used to provide further stability, the support legs connecting the roll holders to a frame leg 6. One support roll may be arranged on either side of the return conveyor belt tensioning device, if necessary. The return conveyor belt tensioning device further has a first roll 55 and a second roll 56 held by a pair of roll braces 57. A pair of rolls is used to provide strength to the arrangement. Each roll brace has a first end 58 and a second end 59. The first end 58 is attached to the cross member plate 7 such that the roll braces with attached first roll and second roll are pivotable about an axis defined by a pair of bearing blocks 21' which are held to the cross member plate 7 in a similar way that has been described regarding the lifting bars 19 of FIG. 4. The bearing blocks 21' are advantageously provided with threaded holes corresponding to the holes shaped by the shape fitting connection 8 between the cross member plate 7 and the attachment plate 9. Clamping a cross member plate 7 and an attachment plate 9 together using a threaded screw thus securely attaches the bearing block to the cross member whilst using the bearing block as one part of the clamp. The lower return conveyor belt loop of belt 3 is arranged to run below the first roll 55 and the weight of the return conveyor belt tensioning device puts tension on the return conveyor belt loop to take up most of the slack present.

FIGS. 13 to 15 show the non-driven pulley end 4 of the conveyor system. Such items as the conveyor belt and support legs have been deleted for better clarity in showing embodiments of the invention. A longitudinal rail attachment rail 61 has a connection element 62 for fastening the attachment rail to the earlier discussed longitudinal rail 18 (or curved rail 18'). The attachment rail 61 has a cross piece 63 stretching at least the width of the conveyor belt. First and second non-driven end plates 64 and 65, respectively, are fastened to the cross piece 63 so that the end plates 64, 65 cannot rotate. A belt return axle 66 is fastened between the first and second end plates 64, 65 to permit the rotation of the return axle. Belt return spacer wheels 67 facilitate the transport of the conveyor belt (not shown) around the return axle 66. Further, a return conveyor plate 11 may be fastened between the first and second end plates to support ends of return conveyor support bars 12, as described earlier. Also, a cleaning device 68, such as a hollow tube having nozzles aimed at the non-driven pulley end 4 may be attached between the first and second end plates 64, 65 to facilitate cleaning of the conveyor system at the non-driven pulley end 4. Further, a side guide holder 16 may be attached to one or both of the first and second end plates 64, 65, the function of the side guide holder having been described earlier. An adjustment system 69, operable via a handle 70, may be arranged to selectively adjust the position of the return axle 66 with respect to the longitudinal direction of the conveyor belt 3. The tension of the conveyor belt looping around the return axle 66 can thus be adjusted. The operation of the adjustment system can alternatively be done via a computer regulated mechanism (not shown), such as electric or pneumatic actuators. Upper conveyor belt looping guides 71 may be attached to the return axle 66 and to a looping guide plate 72, attached between the first and second end plates 64, 65, to guide the conveyor belt 3 around the axle 66.

FIGS. 16 to 19 show the driven pulley end 2 of the conveyor system. Such items as the conveyor belt 3 and support legs have been deleted for better clarity in showing embodiments of the invention. Similarly to the non-driven end 4 described earlier, the driven pulley end 2 has a longitudinal rail attachment rail 61 which has a connection element 62 for fastening the attachment rail to the earlier discussed longitudinal rail 18 (or curved rail 18'). The attachment rail 61 has a cross piece 63 stretching at least the width of the conveyor belt. First and second driven end plates 64' and 65', respectively, are fastened to the cross piece 63 so that the end plates 64', 65' cannot rotate. A belt drive axle 66' is fastened between the first and second end plates to permit the rotation of the drive axle 66'. A motor system 74, having a motor and gearbox plus drive electronics 2', is removably attachable to either of the first and second driven end plates 64' and 65'. The drive axle 66' is attached to the motor system 2' at one end of the axle 66' and to a bearing 75 at the other end of the axle 66'. The motor system 2' may be attached to the driven end plate 64' using an intermediate plate 77 that has an outer shape corresponding to a mounting profile 79 on each of the first and second driven end plates 64' and 65'. Protrusions 78 arranged on the intermediate plate 77 correspond to cutouts 80 arranged on the mounting profile. An indexing protrusion 81 on the intermediate plate 77 corresponds to an indexing slot on the mounting profile 79, so that the intermediate plate can only be inserted and fastened in the mounting profile in one orientation of the intermediate plate 77. Attachment points 76, for example threaded holes, on the motor system 2' correspond to attachment points 83, for example through holes, on the intermediate plate 77 and fasteners 84, for example threaded screws, may be inserted into the intermediate plate 77 through holes then into the threaded holes of the motor system such that, when the screws are tightened, they clamp the intermediate plate and the end plate together whilst also fixing the motor system in place for connecting to the drive axle 66'. The motor system 74 may be fastened to the intermediate plate 77 in one of a plurality of angular positions, making it possible to choose the best position when assembling the conveyor system. For example, the motor system 2' may be angled to avoid interfering with legs or other structures of the conveyor system. To cope with the required torque transfer from the drive axle 66' to the conveyor belt for propelling the conveyor belt (not shown) whilst keeping system weight down as well as cost, the drive axle may have spaced-apart torque transfer wheels 85 (see FIG. 16). The transfer wheels may have click-in fastening elements 86 cooperating with conveyor belt drive strips 84 (see FIG. 16) such that a plurality of drive strips are clickably insertable into the click-in fastening elements to form a drive drum type outer surface around the drive axle 66'.

FIG. 20 shows an embodiment of how an auxiliary functionality may be added to the attachment plate 9. A shape fitting connection 8 as described earlier for FIG. 7a-8b is arranged on the attachment plate 9 and is available and unoccupied after the plate has been clamped to a cross member plate 7. In a manner similar to how the shape fitting connection 8 was used to fasten the attachment plate to the cross member, an auxiliary device, such as an emergency switch mounting plate 87 for securely mounting and holding an emergency switch 88, may be mounted to the attachment plate. Other auxiliary devices (not shown) that may be attached in this manner are cable holders, signs, warning lights and other indicators.

FIGS. 21 to 23 show how a table or shelf 89 is attached directly to the shape fitting connection 8 of the cross member plate 7. At least one support arm 90, having a shaped protrusion 24 cooperating with the shaped slot 23 of the cross member plate 7 to form at least one hole 25 according to what has been described earlier for FIGS. 7 and 7a, is clampable to the cross member to serve as a support for a shelf 89.

FIG. 24 shows an alternative embodiment of a support structure. Use is made of shape fitting connections between upright members 130, cross members 131, longitudinal members 132 and gusset members 134, all of which members being made from plate material and as such being plate-like. The shape fitting connections as such are similar to the shape fitting connections as shown for instance in FIG. 7b. At the location of the shape fitting connections connecting members 135 are used extending through passages between the members 130, 131, 132, 134 and 135 to clamp those members 130, 131, 132, 134 and 135 together.

The above description of possible embodiments of the present invention should not be interpreted as limiting the scope of the present invention.

The invention claimed is:

1. Support structure comprising a combination of a first plate-shaped support element having a first circumference and a second plate-shaped support element having a second circumference, wherein circumferential parts of the first circumference and the second circumference, respectively, have corresponding shapes such that a shape fitting connection between the respective circumferential parts in aligned condition of the first plate-shaped support element and the second plate-shaped support element is possible, wherein the combination comprises at least one passage near the connection in the connected condition of the circumferential parts, as well as at least one connecting element which extends at least partially within the at least one passage so as to limit movement of the first plate-shaped support element and the second plate-shaped support element relative to each other in the thickness direction of the respective plate-shaped support elements, wherein the at least one passage is formed by parts of the connecting circumferential parts of the first circumference and the second circumference.

2. A support structure according to claim 1, wherein the at least one passage is arranged for clamping the plate-shape support elements.

3. A support structure according to claim 1, wherein the at least one connecting element comprises at least one bolt-nut combination and wherein the shank of the bolt extends through the at least one passage.

4. A support structure according to claim 1, wherein the at least one connecting element is of the removable type.

5. A support structure according claim 1, wherein the thickness of the first plate-shaped support element is the same as the thickness of the second support element.

6. A support structure according to claim 1, wherein the thickness of the first plate-shaped support element is different from the thickness of the second support element.

7. A support structure according to claim 6, wherein the thickness of the first plate-shaped support element and the thickness of the second support element differ from each other by a factor of at most two.

8. A support structure according to claim 1, wherein the thickness of the first plate-shaped support element and/or the thickness of the second support element is at most 5 mm.

9. A support structure according to claim 1, wherein the plate-shaped support elements are made of stainless steel.

10. A conveyor comprising an endless, belt-like flexible conveying element for conveying products along a conveying path on an upper part of the conveying element, a frame relative to which two pulley means are rotatable about horizontal axes of rotation extending perpendicularly to the conveying path, wherein the conveying element is passed of the pulley means, the frame comprising an elongate main support member extending parallel to the conveying path and a number of transverse support members which extend transversely to the elongate main support member and which are connected to the elongate main support member in spaced-apart relationship, wherein the transverse support members support at least one guide member extending parallel to the conveying path, which supports and guides at least the upper part of the conveying element during use of the conveyor, wherein at least some of the transverse support members comprise a support structure according to claim 1.

11. A conveyor according to claim 10, wherein the plate-shaped support elements extend vertically.

\* \* \* \* \*